US011897154B2

(12) United States Patent
Patel

(10) Patent No.: US 11,897,154 B2
(45) Date of Patent: Feb. 13, 2024

(54) SHAVING RAZOR SYSTEM INCLUDING SKIN INTERCONNECT MEMBER

(71) Applicant: The Gillette Company LLC, Boston, MA (US)

(72) Inventor: Ashok Bakul Patel, Needham, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 16/369,120

(22) Filed: Mar. 29, 2019

(65) Prior Publication Data

US 2019/0299456 A1 Oct. 3, 2019

Related U.S. Application Data

(60) Provisional application No. 62/650,294, filed on Mar. 30, 2018.

(51) Int. Cl.
*B26B 21/52* (2006.01)
*B26B 21/22* (2006.01)
(Continued)

(52) U.S. Cl.
CPC .......... *B26B 21/521* (2013.01); *B26B 21/225* (2013.01); *B26B 21/443* (2013.01); *B26B 21/48* (2013.01)

(58) Field of Classification Search
CPC ....... B26B 21/521; B26B 21/14; B26B 21/16; B26B 21/225; B26B 21/40; B26B 21/4012; B26B 21/52
(Continued)

(56) References Cited

U.S. PATENT DOCUMENTS 489,995 A * 1/1893 Stenberg ................ B26B 19/14 30/527
831,259 A * 9/1906 Bingler .................. B26B 21/28 30/76
(Continued)

FOREIGN PATENT DOCUMENTS

CA 3091484 A1 10/2019
CN 101848794 A 9/2010
(Continued)

OTHER PUBLICATIONS

U.S. Appl. No. 16/369,056, filed Mar. 29, 2019, Ashok Bakul Patel et. al.
(Continued)

*Primary Examiner* — Jason Daniel Prone
(74) *Attorney, Agent, or Firm* — Kevin C. Johnson; Joanne N. Pappas

(57) ABSTRACT

The invention is directed toward a shaving razor system. The razor system has a handle and a razor cartridge. The handle has at least one skin interconnect member in pivotal relation to a proximal end portion of the handle. The razor cartridge has a housing, at least one blade, and at least one opening which extends through the housing. The razor cartridge is engaged with the skin interconnect member when the skin interconnect member is disposed within the opening securing the razor cartridge to the proximal end portion of the handle. The razor cartridge is in a pivotal relation with the handle, but not with the skin interconnect member. A pivot point of the razor system is desirably disposed near the front blade of the cartridge. Axes of movement in the razor system can be provided by different physical order of connections of razor components.

14 Claims, 32 Drawing Sheets

(51) Int. Cl.
*B26B 21/44* (2006.01)
*B26B 21/48* (2006.01)

(58) Field of Classification Search
USPC ........................................ 30/47–51, 526–536
See application file for complete search history.

(56) References Cited

U.S. PATENT DOCUMENTS 932,619 A * 8/1909 Lawrence ............... B26B 21/52 30/531
971,827 A * 10/1910 Christoph ............... B26B 21/16 30/529
991,998 A * 5/1911 Jones ...................... B26B 21/16 30/64
1,017,138 A * 2/1912 Christiansen ........... B26B 21/52 30/47
1,298,802 A * 4/1919 Sharpnick ............... B26B 21/38 30/527
1,455,725 A * 5/1923 Hartman ................. B26B 21/16 30/67
2,211,255 A 8/1940 Claassen
2,710,447 A * 6/1955 Borden ................... B26B 21/52 30/531
2,744,317 A * 5/1956 Borden ................... B26B 21/24 30/60.5
2,748,468 A * 6/1956 Testi ....................... B26B 21/18 30/529
3,935,639 A * 2/1976 Terry .................... B26B 21/225 30/47
3,950,848 A * 4/1976 Goldstein ............. B26B 21/225 30/47
3,964,159 A 6/1976 Ferraro
3,964,160 A * 6/1976 Gordon ................... B26B 21/28 30/531
4,266,340 A 5/1981 Bowman
4,288,920 A 9/1981 Douglass et al.
4,413,411 A 11/1983 Trotta
4,422,237 A 12/1983 Trotta
4,461,078 A 7/1984 Carreker
4,715,120 A 12/1987 Mcgready
4,850,107 A 7/1989 Valliades et al.
4,879,811 A 11/1989 Cooney
4,985,995 A 1/1991 Coffin
5,029,391 A * 7/1991 Althaus ................. B26B 21/521 30/533
5,093,991 A * 3/1992 Hendrickson ......... B26B 21/521 30/531
5,167,069 A * 12/1992 Quinn ................... B26B 21/523 D28/48
5,206,995 A 5/1993 Min
5,535,518 A * 7/1996 Althaus ................. B26B 21/225 30/527
5,560,106 A 10/1996 Armbruster et al.
5,661,907 A * 9/1997 Apprille, Jr. .......... B26B 21/225 30/47
5,855,071 A 1/1999 Apprille, Jr. et al.
6,115,924 A * 9/2000 Oldroyd ................ B26B 21/225 30/526
6,161,288 A 12/2000 Andrews
6,223,442 B1 * 5/2001 Pina ...................... B26B 21/225 30/50
6,560,881 B2 * 5/2003 Coffin ................... B26B 21/222 30/50
6,581,290 B1 6/2003 Fishel
6,615,498 B1 9/2003 King et al.
6,807,739 B2 10/2004 Follo
7,140,116 B2 * 11/2006 Coffin ................... B26B 21/225 30/529
8,650,763 B2 2/2014 Howell et al.
8,671,577 B2 3/2014 Brown
8,826,543 B2 * 9/2014 Szczepanowski .... B26B 21/446 30/41
8,978,258 B2 * 3/2015 Patel ....................... B26B 21/52 30/527
9,193,079 B2 * 11/2015 Howell ................. B26B 21/225
9,259,846 B1 2/2016 Robertson
9,676,108 B2 6/2017 Beugels et al.
9,731,426 B2 8/2017 Kim et al.
9,844,887 B2 12/2017 Griffin et al.
D874,061 S 1/2020 Verasamy et al.
10,759,069 B2 9/2020 Johnson et al.
10,773,403 B2 9/2020 Washington et al.
10,773,407 B2 9/2020 Washington et al.
10,773,408 B2 9/2020 Johnson et al.
10,843,357 B2 11/2020 Jang
10,864,646 B2 12/2020 Long et al.
10,899,030 B2 1/2021 Verasamy et al.
11,027,443 B2 6/2021 Patel et al.
11,123,888 B2 9/2021 Patel et al.
11,154,999 B2 10/2021 Johnson et al.
11,247,356 B2 2/2022 Broemse et al.
11,285,629 B2 3/2022 Washington
11,325,272 B2 5/2022 Tucker et al.
11,338,460 B2 5/2022 Bourque et al.
11,345,056 B1 5/2022 Wang
11,358,294 B2 6/2022 Johnson et al.
11,420,352 B2 8/2022 Kopelas et al.
D965,221 S 9/2022 Verasamy et al.
11,453,138 B2 9/2022 Bassett et al.
11,571,827 B2 * 2/2023 Patel ..................... B26B 21/222
11,590,669 B2 * 2/2023 Johnson ................ B26B 21/528
11,607,820 B2 * 3/2023 Johnson ................ B26B 21/522
11,613,035 B2 * 3/2023 Bourque ............... B26B 21/521 30/526
2002/0116831 A1 * 8/2002 Coffin ................... B26B 21/225 30/526
2003/0074798 A1 4/2003 Follo
2005/0198843 A1 * 9/2005 Royle ................... B26B 21/225 30/527
2008/0034589 A1 2/2008 Nearing
2008/0209733 A1 9/2008 Johnson
2010/0043242 A1 * 2/2010 Stevens ................. B26B 21/521 30/527
2010/0095530 A1 4/2010 De Klerk et al.
2010/0132204 A1 6/2010 Brown
2010/0236071 A1 9/2010 Szczepanowski et al.
2010/0236072 A1 9/2010 Szczepanowski et al.
2012/0096718 A1 4/2012 Howell et al.
2012/0124840 A1 5/2012 Iaccarino et al.
2012/0210586 A1 * 8/2012 Lelieveld ................ B26B 19/04 30/527
2012/0246947 A1 10/2012 Fang et al.
2012/0260509 A1 * 10/2012 Fang ....................... B26B 21/52 30/527
2012/0291295 A1 11/2012 Braun
2013/0081276 A1 4/2013 Wain et al.
2015/0174775 A1 6/2015 Hodgson
2016/0052153 A1 2/2016 Oosterhoff et al.
2017/0203451 A1 7/2017 Griffin et al.
2018/0001496 A1 1/2018 Robertson et al.
2018/0126572 A1 5/2018 Tomassetti et al.
2019/0152079 A1 5/2019 Chang
2019/0299440 A1 10/2019 Fontecchio et al.
2019/0299441 A1 10/2019 Mcnally et al.
2019/0299442 A1 10/2019 Mcnally et al.
2019/0299443 A1 10/2019 Bourque et al.
2019/0299445 A1 10/2019 Bassett et al.
2019/0299448 A1 10/2019 Siegmann et al.
2019/0299453 A1 10/2019 Bourque et al.
2019/0299454 A1 * 10/2019 Patel ..................... B26B 21/225
2019/0299455 A1 * 10/2019 Patel ..................... B26B 21/225
2019/0299459 A1 * 10/2019 Patel ................... B26B 21/4012
2019/0299465 A1 * 10/2019 Gester ..................... B26B 21/48
2019/0299467 A1 10/2019 Bassett et al.
2019/0299468 A1 10/2019 Bassett et al.
2019/0299469 A1 10/2019 Bassett et al.
2019/0299470 A1 10/2019 Verasamy et al.
2019/0299471 A1 10/2019 Verasamy et al.
2019/0299473 A1 10/2019 Johnson et al.
2019/0299474 A1 10/2019 Bourque et al.
2019/0366573 A1 12/2019 Bridges et al.

(56) References Cited

U.S. PATENT DOCUMENTS

| | | | |
|---|---|---|---|
| 2020/0039098 A1* | 2/2020 | Kopelas ................ B26B 21/225 |
| 2021/0008746 A1 | 1/2021 | Krümke et al. |
| 2021/0122072 A1 | 4/2021 | Ntavos et al. |
| 2021/0299898 A1 | 9/2021 | Mcdaniel et al. |
| 2021/0362362 A1 | 11/2021 | Lettenberger |
| 2022/0168915 A1 | 6/2022 | Washington |
| 2022/0258366 A1 | 8/2022 | Johnson et al. |

FOREIGN PATENT DOCUMENTS

| | | |
|---|---|---|
| CN | 101977738 A | 2/2011 |
| CN | 102470533 A | 5/2012 |
| CN | 102548717 A | 7/2012 |
| CN | 103167938 A | 6/2013 |
| CN | 103180109 A | 6/2013 |
| CN | 205255048 U | 5/2016 |
| CN | 105829037 A | 8/2016 |
| CN | 105829039 A | 8/2016 |
| CN | 107000233 A | 8/2017 |
| CN | 107073728 A | 8/2017 |
| EP | 0136197 A1 | 4/1985 |
| GB | 2030909 A | 4/1980 |
| GB | 2507971 A | 5/2014 |
| JP | 2008540053 A | 11/2008 |
| JP | 2015510837 A | 4/2015 |
| JP | 2015515884 A | 6/2015 |
| JP | 2016504096 A | 2/2016 |
| KR | 20140009736 A | 1/2014 |

OTHER PUBLICATIONS

U.S. Appl. No. 16/369,073, filed Mar. 29, 2019, Ashok Bakul Patel et al.

U.S. Appl. No. 16/369,090, filed Mar. 29, 2019, Ashok Bakul Patel et al.

All Office Actions, U.S. Appl. No. 16/369,056.

All Office Actions, U.S. Appl. No. 16/369,073.

All Office Actions, U.S. Appl. No. 16/369,090.

PCT International Search Report with Written OBinion in corresgonding Int'l Appln. PCT/US2019/024176 dated Jun. 24, 2019.

* cited by examiner

SHAVING RAZOR SYSTEM INCLUDING SKIN INTERCONNECT MEMBER

FIELD OF THE INVENTION

The present invention relates to a shaving razor system, and more particularly to a shaving razor system including at least one skin interconnect member.

BACKGROUND OF THE INVENTION

Razor cartridges are designed to cut or shave a user's hair. The cartridges include one or more blades having at least one sharpened edge. The blades are held in place by what is commonly referred to as a housing. The housing typically includes one or more features to improve the overall shaving experience. Such common features include a guard which is located on the housing in front of the blades and a cap which is located behind the blades. The guard often includes an elastomeric member and the cap often includes a lubricating strip of some kind.

On the market today are a vast number of razor cartridge configurations. Some have big guards, some have smaller guards, some guards have elastomeric members with fins while others have elastomeric members with depressions and some guards have lubricating strips. Similarly, some razor cartridges have big caps, some have smaller caps, and some caps have a lubricating strip. Most razors today provide skin benefits directly on the razor cartridge via the cap, the lubricating strip, soap elements, and/or skin engaging elastomeric fin elements.

Most wet shaving systems available today use these types of razor cartridges that attach to a handle. After a blade within the razor cartridge becomes dull, the razor cartridge may be disposed of and a new razor cartridge may be attached to the same handle. Users typically hold onto their handles for a very long time. A variety of techniques have been used for attaching razor cartridges to handles. Most techniques include attaching the razor cartridge to the handle in a way that allows the razor cartridge to pivot in a controlled manner, about its major axis. Pivotal attachment of the razor cartridge allows the blade or blades mounted in the razor cartridge to follow skin surface contours independently of the handle orientation. The razor cartridge is pivotal between limits and ordinarily is biased toward a preferred neutral angular position vis-a-vis the handle. A variety of techniques have been used for detaching razor cartridges to handles. Most techniques include a cartridge eject mechanism mounted on the handle that is spaced next to the razor cartridge when the handle is attached to the cartridge. The pivot functionality disposed on a razor cartridge and the pivot functionality and the cartridge ejection mechanism between a razor cartridge and a handle is costly and complex to manufacture.

Moreover, in order to meet the demands of consumers, numerous cartridge designs have been configured. The numerous designs come at a cost however as much effort is spent on each design. That is, each cartridge is designed from scratch such that none of the molds and production equipment used to make one cartridge can be utilized to make a cartridge of a different design. For example, the molds and production equipment used to make the Gillette™ Mach3™ razor cartridge could not be used to make the Gillette™ Fusion™ razor cartridge. This results in higher cost as product design, molding and production equipment have to be executed separately for each product.

Thus, there is a need for an alternative overall razor design to reduce cost and effort to produce different razor cartridges to meet the demands of consumers.

Ideally, one would like to start with a standard blade unit that houses the blades that is capable of quick, easy, intuitive, and safe attachment to a handle. However, there is also a need to have a razor cartridge that is pivotal relative to the handle, but that is less complex and less costly to manufacture and assemble.

One could then have the flexibility to use various configurations of handles to the standard blade unit or to a small number of standard blade units. It is an object of the invention to provide the desired skin benefits as a pivoting part of the handle.

SUMMARY OF THE INVENTION

The present invention is directed to a razor system. The razor system includes a razor cartridge having a housing with a front side and a front blade mounted to the housing, the front blade most proximal to the front side of the housing. The razor system also includes a handle, the handle including a proximal end portion, a distal end portion, at least one skin interconnect member, a first A1 pivot mechanism that enables rotation of the at least one skin interconnect member about a first axis A1, the axis A1 rotating relative to the handle, and at least one or more pivot mechanisms that enable rotation of the at least one skin interconnect member about one or more axes A2, A3, A4, A5, or combination thereof, each of the A2, A3, A4, and A5 axes rotating relative to the handle.

In one aspect, the order of physical connection of the razor system components, starting furthest away from the distal end portion of the handle to the A1 pivot mechanism is (1) the razor cartridge, (2) the skin interconnect member, (3) the at least one or more pivot mechanisms that enable rotation of the skin interconnect member about axis A2, axis A3, axis A4, axis A5, or combination thereof.

In another embodiment, the present invention is directed to a razor handle including a Proximal end portion, a distal end portion, at least one skin interconnect member, an A1 pivot mechanism that enables rotation of the at least one skin interconnect member about axis A1, and at least one or more pivot mechanisms that enable rotation of the at least one skin interconnect member about axes A2, A3, A4, A5, or combination thereof. The order of physical connection of the razor handle components, starting furthest away from the distal end portion of the handle to the A1 pivot mechanism is (1) the razor cartridge, (2) the skin interconnect member, (3) the at least one or more pivot mechanisms that enables rotation of said skin interconnect member about axis A2, axis A3, axis A4, axis A5, or combination thereof.

In one aspect, the at least one skin interconnect member is joined with the housing to provide a pivot point P for the razor cartridge relative to the handle, the pivot point P is located up to about 3.5 mm in front of the front blade edge, up to about 11 mm behind the front blade edge, up to about 1 mm above the shave plane S, and up to about 2.5 mm below the shave plane S, and wherein the at least one skin interconnect member is not pivotal relative to the housing.

In another aspect, the pivotal relation of the skin interconnect member to a proximal end portion of the handle includes one or more rolling element bearings or one or more sliding contact bearings. The mechanism to enable rotation about axis A1 includes one or more rolling element bearings.

In yet another aspect, the at least one skin interconnect member includes a fluid element, a thermal element, a skin scrubbing element, a hair trimmer, an epilator, or any combination thereof. The at least one skin interconnect member includes a trapezoidal prism shape. A top surface of the at least one skin interconnect member is not disposed on a shave plane of the razor cartridge. The at least one skin interconnect member has a length from about 20 mm to about 40 mm, a width from about 1.5 mm to about 5 mm, a volume greater than about 300 $mm^3$, a top surface area of about 40 $mm^2$ to about 120 $mm^2$, or any combination thereof. The at least one skin interconnect member has a skin interfacing surface. One or more ports are disposed on a top surface of the at least one skin interconnect member.

In one embodiment, the handle includes a mass of about 57 grams to about 150 grams.

In another embodiment, the razor cartridge is releasably engaged with the at least one skin interconnect member to replaceably secure the razor cartridge to the proximal end portion of the handle. The order of physical connection of components includes the razor cartridge connected to the skin interconnect member, the skin interconnect member connected to a mechanism to enable rotation about axis A4 and/or axis A3 and/or axis A2, the axis A4 mechanism and/or the axis A3 mechanism and/or axis A2 mechanism connected to a mechanism to enable rotation about axis A1, the axis A1 mechanism connected to the handle.

The handle includes a handle neck area and a handle main body and wherein the PL1-to-PL2 included angle between shave plane S and midplane PL2 of the handle main body is about −60 degrees to +90 degrees. In another embodiment, the handle includes a handle neck area and a handle main body and wherein the PL1-to-PL2 included angle between shave plane S and midplane PL2 of the handle main body is about −45 degrees to +45 degrees. Still further, the handle includes a handle neck area and a handle main body and wherein the PL2-to-PL3 included angle between midplane PL2 of the handle main body and midplane PL3 of the handle neck area is about −100 degrees to +100 degrees. Further still, the handle includes a handle neck area and a handle main body and wherein the PL2-to-PL3 included angle between midplane PL2 of the handle main body and midplane PL3 of the handle neck area is about −45 degrees to +90 degrees.

In one other embodiment, the rotational stiffness of the mechanism that enables rotation of the skin interconnect member about axis A1 is about 0 N-mm/deg to 0.5 N-mm/deg. The rotational stiffness of at least one or more of the mechanisms that enable rotation about axis A2, axis A3, axis A4, axis A5, or combination thereof is about 0.8 N-mm/deg to about 2.0 N-mm/deg.

In another embodiment, a handle includes a proximal end portion, a distal end portion, and at least one skin interconnect member. The skin interconnect member is in pivotal relation to the proximal end portion of the handle. The at least one skin interconnect member is joined within the at least one opening of the housing to provide a pivot point P for the razor cartridge relative to the handle. The pivot point P is located up to about 3.5 mm in front of the front blade edge, up to about 11 mm behind the front blade edge, up to about 1 mm above the shave plane S, and up to about 2.5 mm below the shave plane S. In another aspect, the at least one skin interconnect member is not pivotal relative to the housing.

In another aspect, a first plane B parallel to a topmost point on a top surface of the at least one skin interconnect member and wherein a second plane Q at a rearward most point of a rearward surface of the at least one skin interconnect member, wherein the rearward most point lies within 2 mm from the first plane B, and wherein the second plane Q is perpendicular to the first plane B and the second plane Q and the first plane B intersect at point C, wherein a pivot point P2 of a rotational axis of the at least one skin interconnect member is in a region which is up to about 2 mm in front of a point C, up to about 12.5 mm behind point C, up to about 2 mm above the first plane B, and up to about 2.5 mm below the first plane B.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

The details of one or more embodiments of the invention are set forth in the accompanying drawings and the description below. It is understood that certain embodiments may combine elements or components of the invention, which are disclosed in general, but not expressly exemplified or claimed in combination, unless otherwise stated herein. Other features and advantages of the invention will be apparent from the description and drawings, and from the claims.

DETAILED DESCRIPTION OF THE INVENTION

The invention is directed toward a novel shaving razor array system. The shaving razor array system has one or more handles capable of being coupled with one or more razor cartridges. Each handle has a proximal end portion, a distal end portion, and at least one skin interconnect member that is in pivotal relation to the proximal end portion. Each razor cartridge has a housing, a guard, a cap, and at least one blade. The razor cartridge is releasably engaged with the at least one skin interconnect member to replaceably secure the razor cartridge to the proximal end portion of the handle.

Figure 1A:
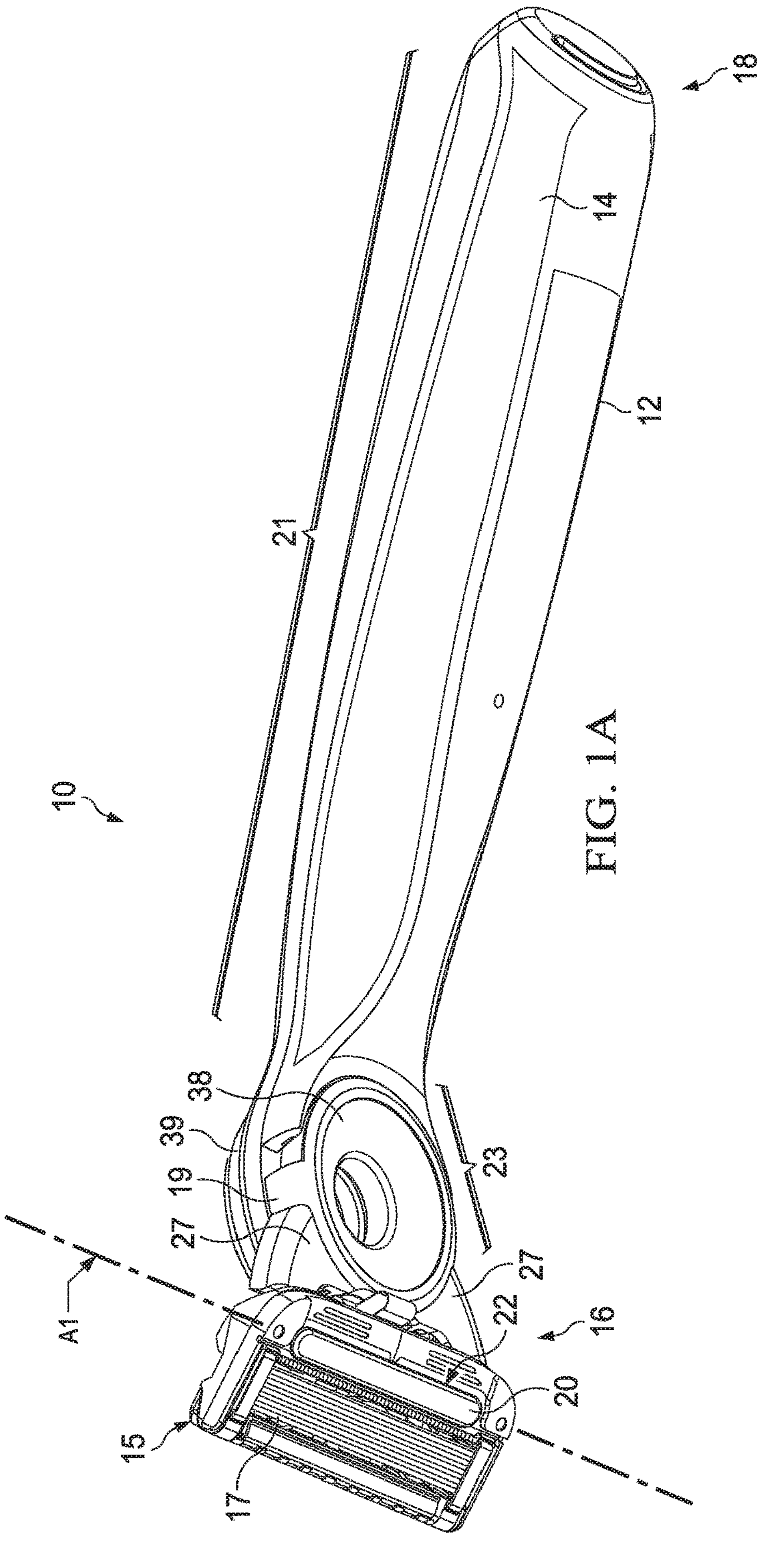
FIG. 1A is a perspective view of a shaving razor system including at least one skin interconnect member in accordance with the present invention.

Referring to FIG. 1A, a perspective view of one embodiment of a shaving razor system 10 is shown. The shaving razor system 10 includes a handle 12 and a razor cartridge 15 which is removably connected to the handle. The handle 12 includes an elongated gripping portion 14, a proximal end portion 16, a distal end portion 18, and at least one skin interconnect member 20. The handle 12 may comprise a handle neck area 23 and a handle main body 21. The handle neck area 23 may be incorporated at the proximal end portion 16. The handle neck area 23 may connect the main body 21 to the razor cartridge 15. A gripping portion 14 may be incorporated with the handle main body 21.

The handle 12 provides one or more pivot motions for the at least one skin interconnect member 20. The pivot A1 axis of at least one the pivot motion is usually generally transverse to the handle. It should be noted that the razor cartridge 15 of the present invention does not comprise a pivot mechanism in and of itself. Also, the interface between the razor cartridge 15 and the handle 12 of the present invention does not comprise a pivot mechanism in and of itself. However, when the razor cartridge 15 is connected to the handle 12 via the skin interconnect member 20, the skin interconnect member 20 and the razor cartridge 15 are locked together and while they do not pivot relative to one another, they pivot together relative to the handle 12.

The handle 12 may be of any suitable shape. The handle 12, for example, may be an elongated barrel shape or may be a contoured shape. The handle 12 may include an elongated gripping portion. The handle may include one, two, or more arms 27. The arm or arms 27 may be located at the proximal end 16 of the handle. The two or more arms 27 may be spaced apart from one another. The handle 12 may be, for example, an elongated barrel shape that includes two arms 27 that are spaced apart and that are located at the proximal end 16 of the handle 12. The handle 12 may be, for example, a contoured shape that includes two arms 27 that are spaced apart and that are located at the proximal end 16 of the handle 27. The handle 12 may be made from any suitable material. The handle 12 may be made, for example, from a metal, a polymer, an elastomer, a plastic, a thermoplastic, a rubber, any other suitable material, or any combination thereof. The handle 12 may be made by any suitable process. The handle 12 may be made, for example, by molding, injection molding, insert injection molding, casting, die-casting, extruding, any other suitable method, or any combination thereof.

Figure 1B:
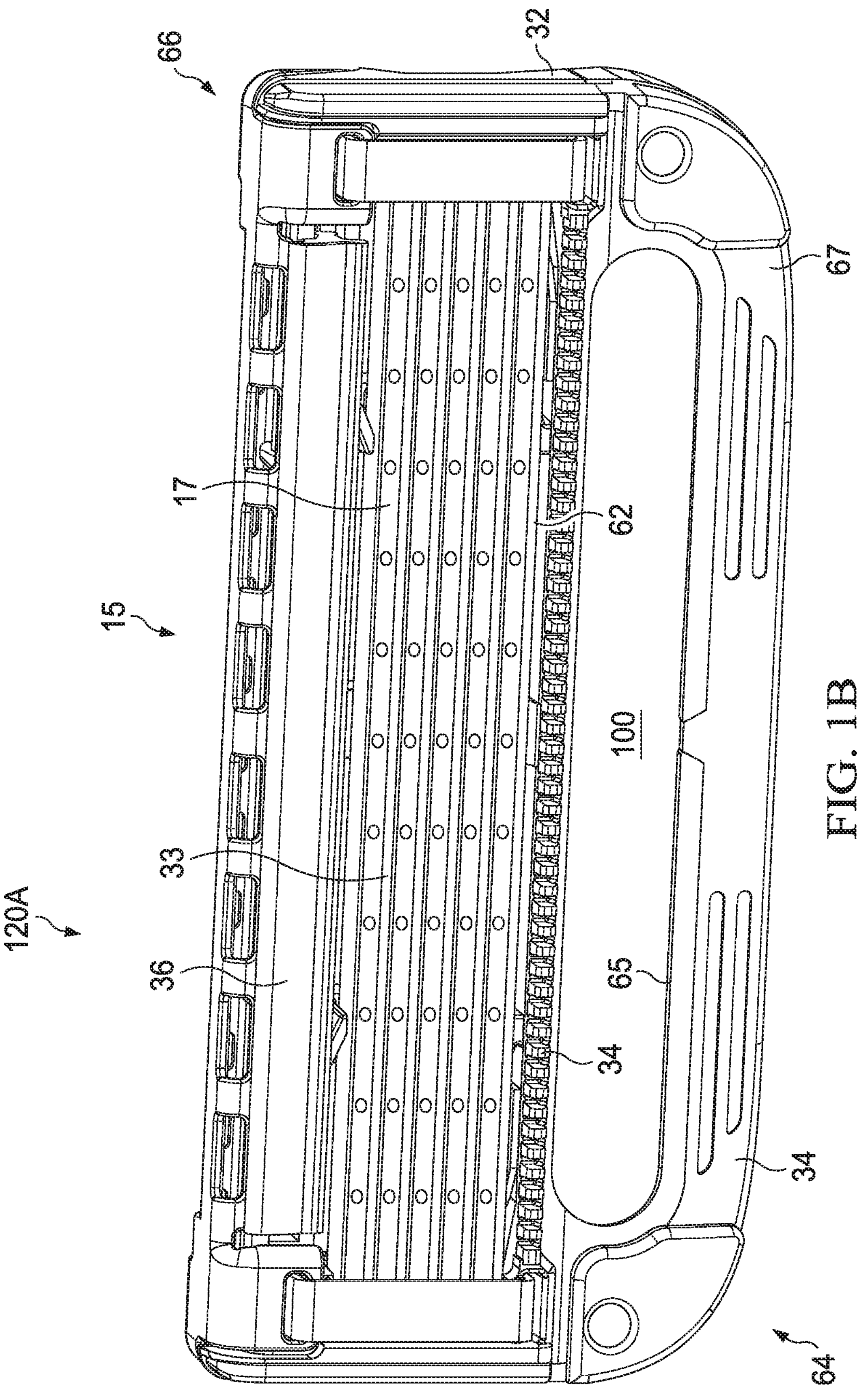
FIGS. 1B-C are front and back perspective views of a razor cartridge of the present invention.
Figure 1D:
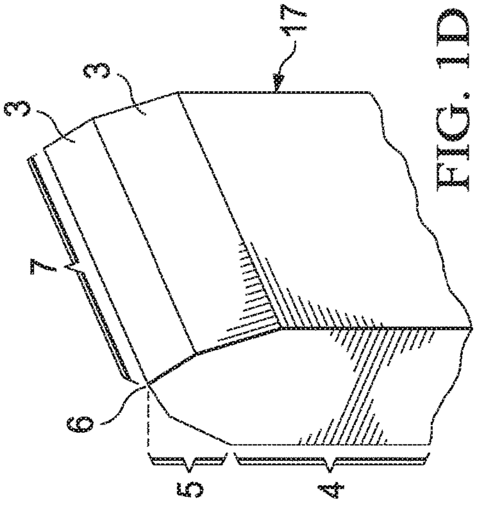
FIG. 1D is a schematic representation of a razor blade of the present invention.
Figure 1C:
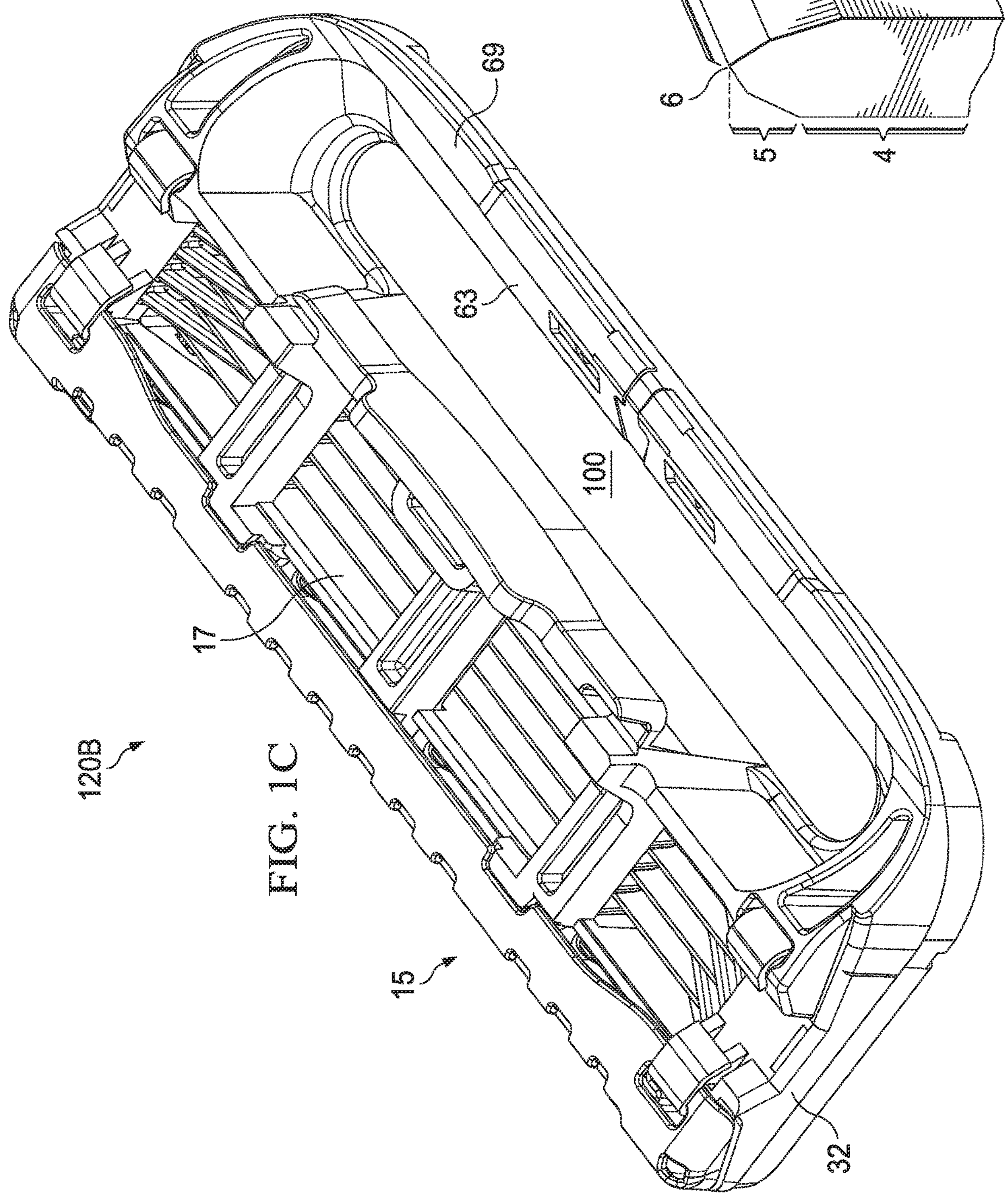

FIG. 1B-C shows top and bottom views 120*a* and 120*b* of a razor cartridge 15 in accordance with the present invention. In top view 120*a* of FIG. 1B, razor cartridge 15 has a housing 32 with a guard 34, a cap 36, and at least one or more blades 17 having cutting edges 33. The razor cartridge has a front side 64 and a back side 66. A front blade 62 is the most proximal blade at the front side 64 of the razor cartridge 15. Adjacent to a front blade 62 is an opening 100 which extends through the housing 32 from a top surface 67 to a bottom surface 69. The guard 34 or other features may be situated between a front blade and the opening. The perimeter 65 of the opening 100 in the top surface 64 of the housing 32 is within a range of about 50 mm to about 70 mm, and preferably about 66.36 mm.

The razor cartridge 15 is in pivotal relation to the proximal end portion 16 of the handle 12 only when connected with the skin interconnect member 20. The razor cartridge 15 when engaged with the skin interconnect member 20 may pivot about an axis A1 (shown in FIGS. 1A, 2A, and 3A) that is generally transverse to the handle 12. As shown in FIG. 1A, the skin interconnect member 20 of the handle 12 forms a portion of a top surface 67 of the razor cartridge 15.

FIG. 1C also shows a bottom view 120*b* of a razor cartridge 15. In one embodiment, the opening 100 extends into a bottom surface 69 of the housing 32. The perimeter 63 of the opening 100 at the bottom surface 69 of the housing 32 is preferably larger than perimeter 65. The perimeter 63 may range from about 75 mm to about 100 mm, and preferably be about 81.2 mm. The opening 100 at the bottom surface of the housing may desirably be wider than the opening 100 at the top surface of the housing. Accordingly, a funnel shape (e.g., a shape tapering from a larger to a smaller opening) may be achieved.

As shown in FIG. 1C, blade 17 of FIG. 1B includes a blade body 4, two bevels 3 for each of two flanks 5 which intersect at tip 6 forming an edge 7. The term “razor blade” in the present invention desirably signifies a “substrate” comprised of stainless steel which includes a blade body and at least one flank. Desirably, a razor blade includes two flanks forming a blade edge and a blade body. The two flanks intersect at a point or tip, or what is oftentimes referred to as the ultimate tip. Each flank may have one, two or more bevels. The blade body is generally the remaining area of the razor blade beneath the flanks or bevels.

The at least one blade 17 of the razor cartridge 15 may be mounted to the housing 32 between the cap 36 and the guard 34. The guard and the cap may define a shaving plane S that is tangent to the guard and the cap. The guard may be a solid or segmented bar that extends generally parallel to the at least one blade. The guard may comprise a skin-engaging member (e.g., a plurality of fins) in front of the blades for stretching the skin during a shaving stroke. The skin-engaging member may, for example, be insert injection molded or co-injection molded to the housing. Other known assembly methods may also be used such as adhering, bonding, attaching, ultrasonic welding, or mechanical fastening. The skin-engaging member may be molded from a softer material (i.e., lower durometer hardness) than the housing. For example, the skin-engaging member may have a Shore A hardness of about 20, 30, or 40 to about 50, 60, or 70. The skin-engaging member may be made from thermoplastic elastomers (TPEs) or rubbers; examples may include, but are not limited to silicones, natural rubber, butyl rubber, nitrile rubber, styrene butadiene rubber, styrene butadiene styrene (SBS) TPEs, styrene ethylene butadiene styrene (SEBS) TPEs (e.g., Kraton), polyester TPEs (e.g., Hytrel), polyamide TPEs (Pebax), polyurethane TPEs, polyolefin based TPEs, and blends of any of these TPEs (e.g., polyester/SEBS blend). In certain embodiments, the skin-engaging member may comprise Kraiburg HTC 1028/96, HTC 8802/37, HTC 8802/34, or HTC 8802/11 (KRAIBURG TPE GmbH & Co. KG of Waldkraiburg, Germany). A softer material for the skin-engaging member may enhance skin stretching, as well as provide a more pleasant tactile feel against the skin of the user during a shaving stroke. A softer material may also aid in masking the less pleasant feel of the harder material of the housing and/or the fins against the skin of the user during a shaving stroke.

The at least one blade may be mounted and secured to the housing by one or more clips. Other assembly methods known to those skilled in the art may also be used to secure and/or mount the at least one blade to the housing including, but not limited to, wire wrapping, cold forming, hot staking, insert molding, ultrasonic welding, and adhering. The clips may comprise a metal, such as aluminum for conducting heat and acting as a sacrificial anode to help prevent corrosion of the blades. The razor cartridge may have any number of blades depending on the desired performance and cost of the razor cartridge. The razor cartridge may have, for example, one blade, two blades, three blades, four blades, five blades, six blades, seven blades, or even more blades. Once the blades have become dulled (or damaged) the consumer may disengage the razor cartridge from the skin interconnect member and replace the used razor cartridge with a new razor cartridge.

The cap of the razor cartridge may be a separate molded or extruded component that is mounted to the housing. The cap may be, for example, a shaving aid filled reservoir or an extruded lubrication strip. The cap may be, for example, a plastic or metal bar to support the skin and define the shaving plane. The cap may be molded or extruded from the same material as the housing or may be molded or extruded from a more lubricious shaving aid composite that has one or more water-leachable shaving aid materials to provide increased comfort during a shave stroke.

The shaving aid composite may comprise a water-insoluble polymer and a skin-lubricating water-soluble polymer. Suitable water-insoluble polymers which may be used include, but are not limited to, polyethylene, polypropylene, polystyrene, butadiene-styrene copolymer (e.g., medium and high impact polystyrene), polyacetal, acrylonitrile-butadiene-styrene copolymer, ethylene vinyl acetate copolymer and blends such as polypropylene/polystyrene blend, may have a high impact polystyrene (i.e., Polystyrene-butadiene), such as Mobil 4324 (Mobil Corporation). Suitable skin lubricating water-soluble polymers may include polyethylene oxide, polyvinyl pyrrolidone, polyacrylamide, hydroxypropyl cellulose, polyvinyl imidazoline, and polyhydroxyethylmethacrylate. Other water-soluble polymers may include the polyethylene oxides generally known as POLYOX (available from Union Carbide Corporation) or ALKOX (available from Meisei Chemical Works, Kyota, Japan). These polyethylene oxides may have molecular weights of about 100,000 to 6 million, for example, about 300,000 to 5 million. The polyethylene oxide may comprise a blend of about 40 to 80% of polyethylene oxide having an average molecular weight of about 5 million (e.g., POLYOX COAGULANT) and about 60 to 20% of polyethylene oxide having an average molecular weight of about 300,000 (e.g., POLYOX WSR-N-750). The polyethylene oxide blend may also contain up to about 10% by weight of a low molecular weight (i.e., molecular weight of less than about 10,000) polyethylene glycol such as PEG-100.

The shaving aid composite may also include a complex of a skin-soothing agent with a cylcodextrin, low molecular weight water-soluble release enhancing agents such as polyethylene glycol (e.g., 1-10% by weight), water-swellable release enhancing agents such as cross-linked polyacrylics (e.g., 2-7% by weight), colorants, antioxidants, preservatives, microbicidal agents, beard softeners, astringents, depilatories, medicinal agents, conditioning agents, moisturizers, cooling agents, and the like.

The razor cartridge may or may not be the removable type and may be of any suitable size and shape and comprises a housing having a top surface, a bottom surface, a front side, and a back side. The cartridge comprises one or more blades with one or more cutting edges mounting to the housing. The cartridge includes a front blade mounted to the housing toward a front side. The front blade is the blade most proximal to the front side of the housing.

The cartridge also desirably comprises at least one handle engaging surface, preferably in the form of at least one opening or aperture in the housing. The opening is disposed in front of the front blade and the at least one opening extends through the housing from a top surface of the housing to a bottom surface of the housing.

In a preferred embodiment of the present invention, the cartridge opening desirably has a funnel-like shape and extends through the cartridge (e.g., from a top surface of the cartridge to a bottom surface of the cartridge). Due to the tapered nature of the funnel shape, there is a difference in the size of the opening. Desirably, the funnel shape is oriented such that the opening is larger on the bottom surface of the cartridge than at the top surface of the cartridge. The razor cartridge disclosed herein can include the razor cartridge disclosed in co-owned, co-pending US application, which are hereby incorporated herein by reference.

The razor cartridge may be attached to the handle by engaging the razor cartridge with the at least one skin interconnect member on the handle. The bottom side of the opening on the back side of the razor cartridge engages with a corresponding top application surface or surfaces on the at least one skin interconnect member of the handle. As the skin interconnect member is pushed through the opening, the skin interconnect member approaches the opening on the top surface of the cartridge.

The skin interconnect member is substantially encased within the opening in the razor cartridge. The opening shape is substantially similar to the shape of the skin interconnect member such that the skin interconnect member fits snugly and substantially does not move within the opening. In this way, the handle and the cartridge connection is robust and secure to provide a safe environment during shaving. If the opening in the cartridge is funnel shaped, the skin interconnect member is also desirably substantially funnel shaped in a complementary or conformal manner.

The razor cartridge may pivot between limits and ordinarily may be biased toward a preferred neutral angular position vis-a-vis the handle. The pivot limits and biasing may be accomplished by any means known in the art, including mechanical limits.

The top or application surface of the skin interconnect member may or may not be on the same plane as the blades or the top surface of the razor cartridge.

The skin interconnect member provides the pivot mechanism for the razor system after the skin interconnect member is engaged with the cartridge. The skin interconnect member does not pivot relative to the cartridge housing.

The razor cartridge may be mechanically aligned with the corresponding/opposing at least one skin interconnect member. The direction of the force between the opposing skin interconnect members (e.g., between the razor cartridge and the at least one skin interconnect member) may be generally transverse to the force required to remove and attach the razor cartridge with the at least one skin interconnect member (e.g., which may be generally parallel to the elongated gripping portion of the handle).

As shown in FIG. 1A, the handle 12 may include at least one skin interconnect member 20. The skin interconnect member 20 is an element that is disposed generally transverse to the longitudinal axis of the handle 12. The skin interconnect member 20 has a top surface or skin interfacing surface 22 that allows a direct interface or a view of the handle with the skin, with or without contacting the skin. The skin interconnect member 20 is in pivotal relation to the proximal end portion 16 of the handle via a pivot mechanism 30 (shown in 2B-2C and 3B-3C and in greater detail in FIG. 5). The skin interconnect member 20 is in a pivotal relation to the handle and pivots about an axis A1 that is generally transverse to the longitudinal axis of the handle 12.

The at least one skin interconnect member 20 preferably comprises a skin interfacing surface 22, which interfaces with the skin (e.g., by application of a fluid or heat) without obstruction from the razor cartridge 15, but which may or may not directly contact the skin. The at least one skin interconnect member 20 may provide one or more benefits to a user's skin. For example, the at least one skin interconnect member 20 may include a fluid dispensing element, a thermal element which heats or cools the skin, or a combination thereof. The skin interconnect member 20 may also comprise other consumer benefits such as a skin agitation or scrubbing element, a hair trimmer, an epilator, or any combination thereof. The fluid element or the thermal element or both may be provided within the at least one skin interconnect member 20. The fluid element or the thermal element or both may be released from a surface of the at least one skin interconnect member.

As shown in the illustrated embodiments, the razor can be configured to deliver benefits to the skin of the user by extending the handle 12 through an opening 100 (shown in FIG. 1B) in the blade cartridge unit 15 to enable handle benefit delivery components to be close to the skin. The skin interconnect member 20, which provides the handle 12 a direct but not necessarily contacting interface to the skin, is in pivotal relation to the proximal end portion 18. As shown in one embodiment in FIG. 1A, a top skin interfacing surface 22 of the skin interconnect member 20 of the handle 12 may form a portion of a top surface 67 of the razor cartridge 15. As noted, the top skin interfacing surface 22 may or may not directly contact a user's skin.

Figure 2A:
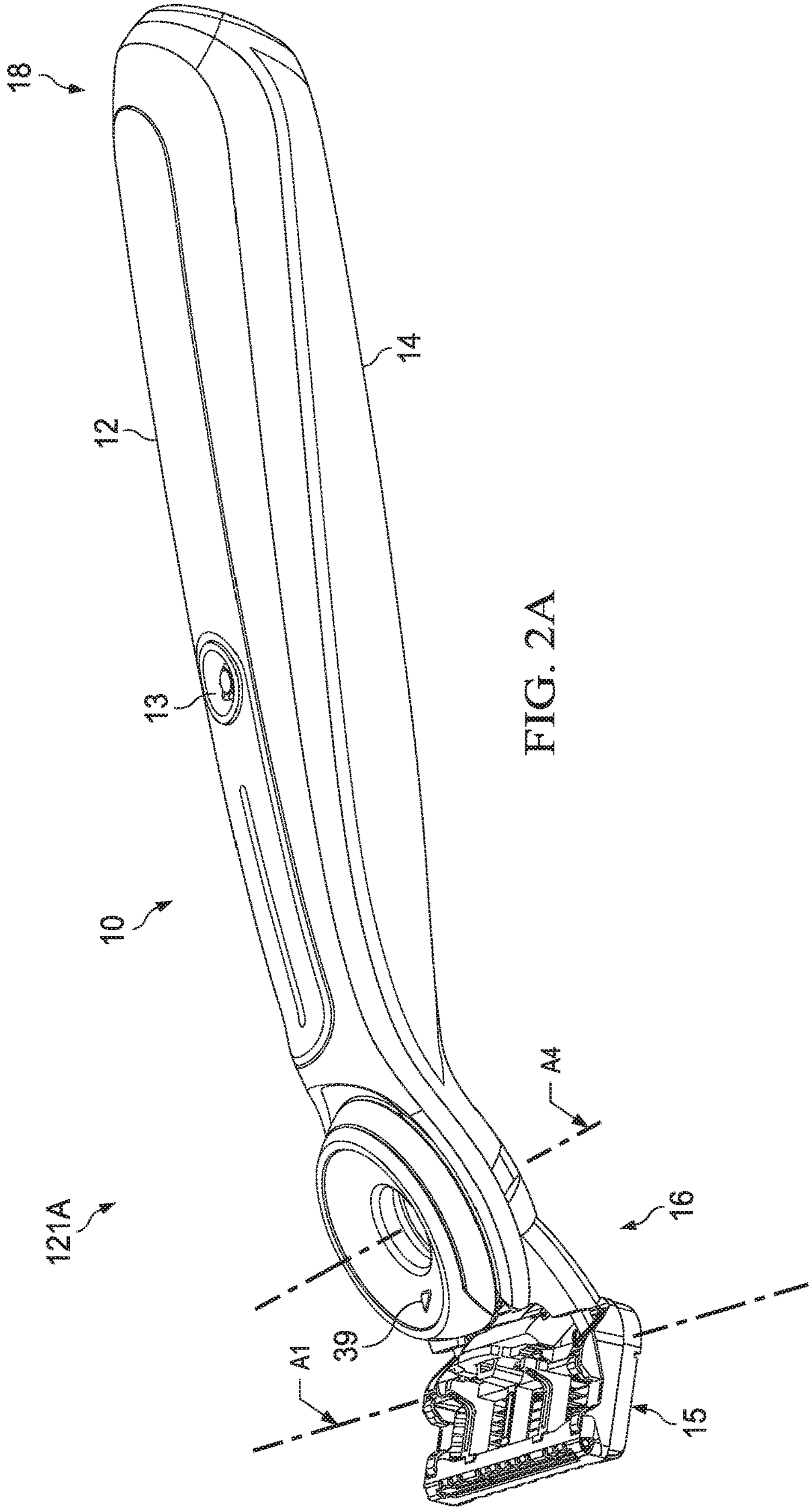
FIGS. 2A-B shows top and back perspective views of a shaving razor including at least one skin interconnect member for delivering a heating or cooling skin benefit in accordance with the present invention.
Figure 2B:
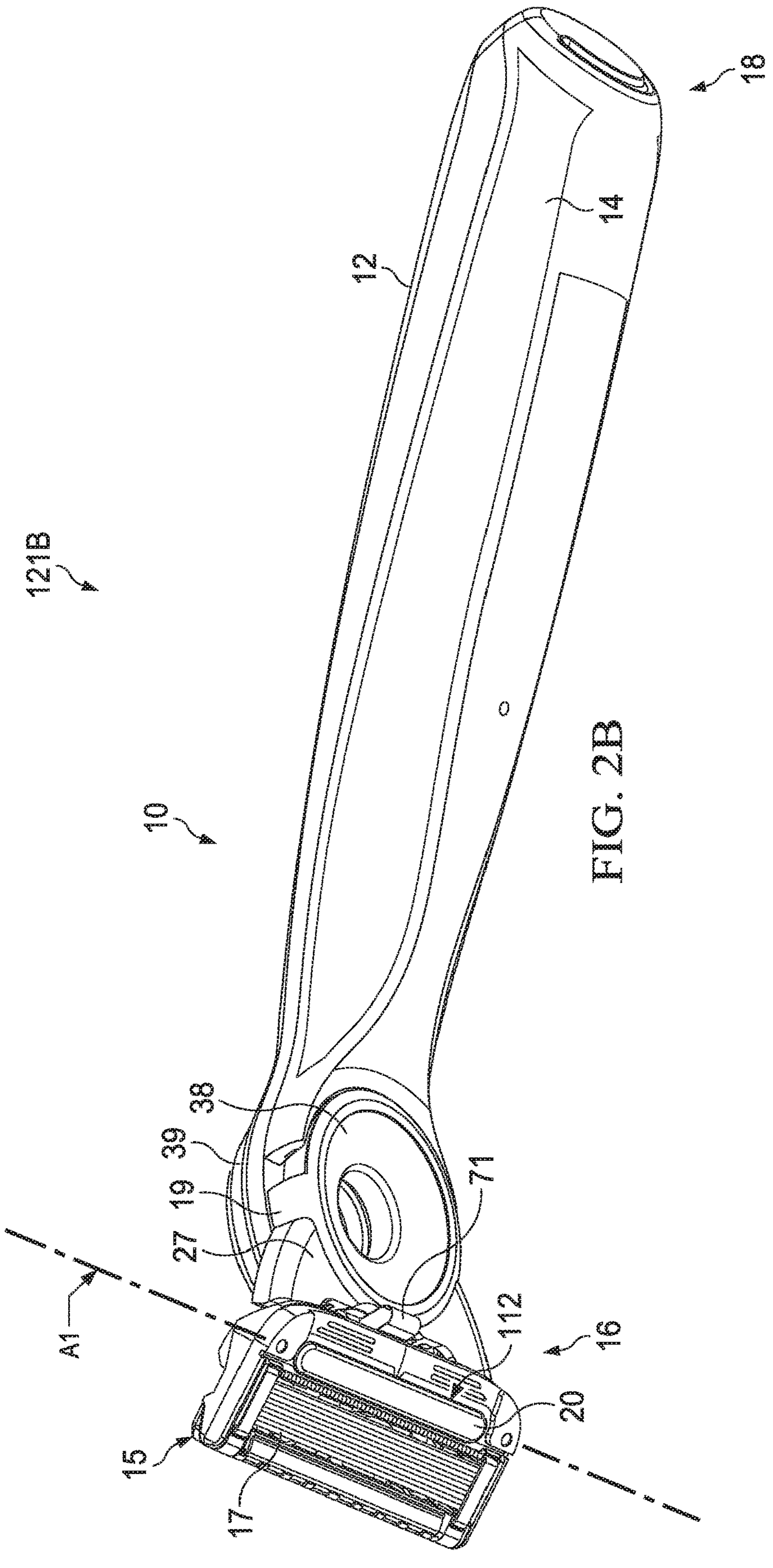
Figure 2C:
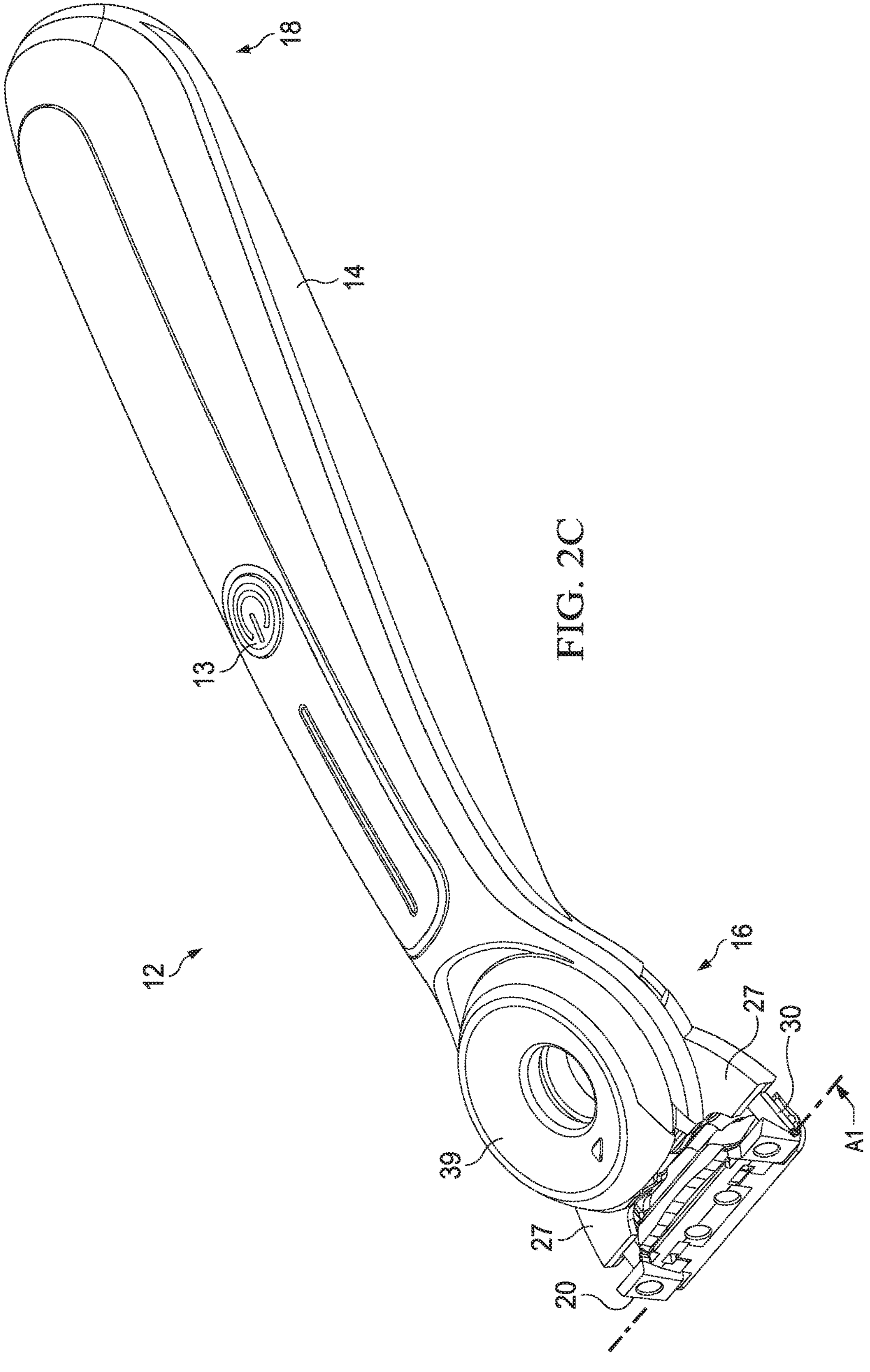
FIG. 2C is a perspective view of the shaving razor handle including at least one skin interconnect member for a heating or cooling skin benefit shown in FIG. 2A.
Figure 2D:
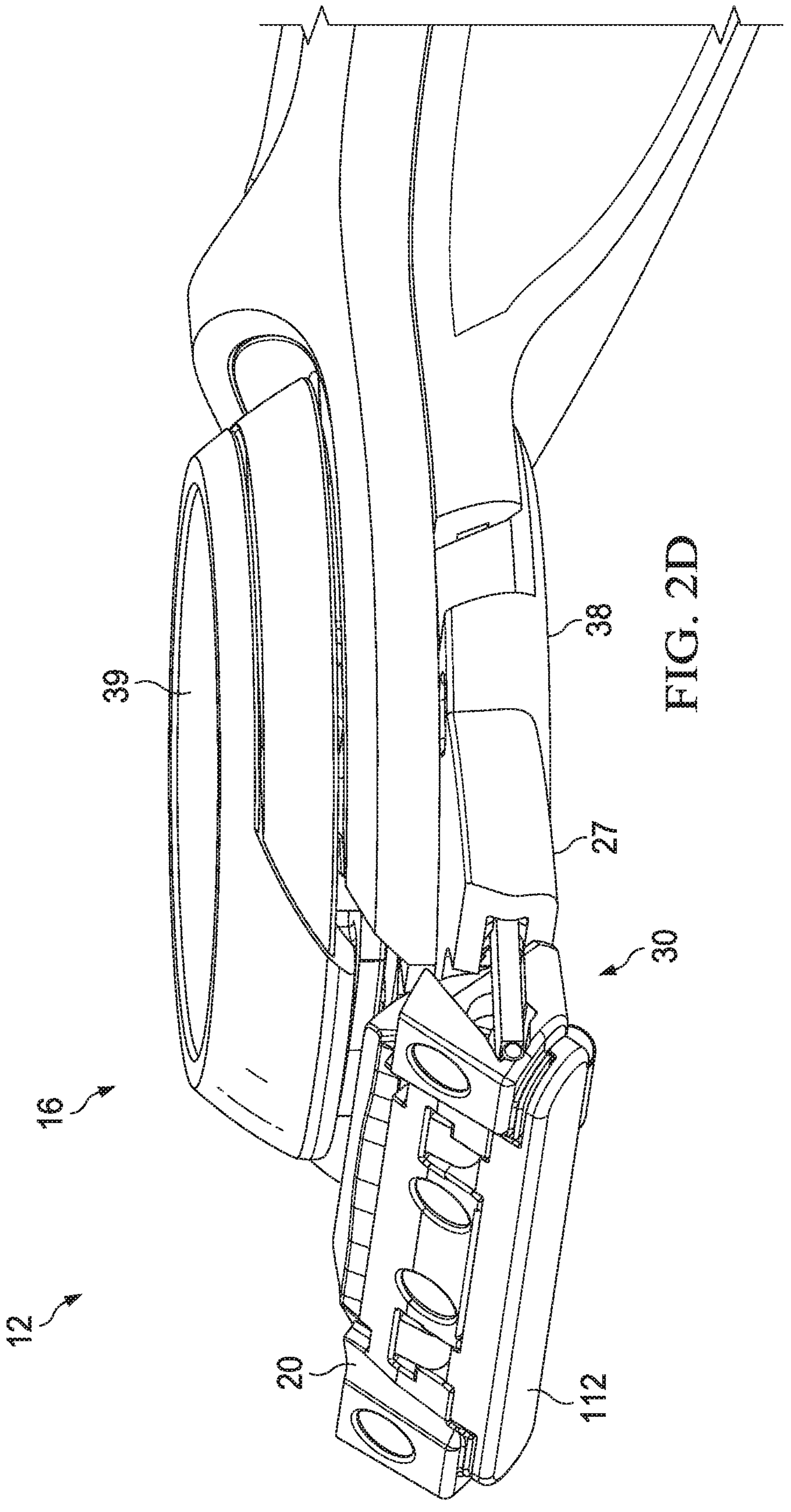
FIG. 2D is a close-up perspective view of the skin interconnect member of the handle of that is shown in FIG. 2B.

Two types of non-limiting embodiments of razors providing for a skin benefit are disclosed herein. The first embodiment, shown in FIGS. 2A-2D, belongs to a type of razor that provides a benefit to the user by heating or cooling the skin. In FIGS. 2A and 2B, views 121A and 121 B provide top and bottom perspectives of this first embodiment. This first embodiment can have a handle 12, a blade cartridge unit 15 that can releasably attach to the handle 12 and can contain one or more blades 17, and a skin interconnect member 20 which can deliver a heat skin benefit. The blade cartridge unit 15 may be detached using the cartridge eject mechanism 39 mounted at the proximal end 16 of the handle 12. The razor handle 12 may be configured to rotate the razor cartridge 15 about an axis of rotation A1 using pivot mechanism 30 and about an axis of rotation A4 using pivot mechanism 38. A portion of the handle 12 can extend through blade cartridge unit 15 and be exposed as thermal surface 112, discussed more fully below. As shown in FIGS. 1A and 1*n* more detail in FIGS. 2C and 2D, in which the blade cartridge unit 15 has been removed, thermal surface 112 is a surface of a skin interconnect member 20 and can be used to deliver a cooling or heating benefit to the user during shaving. Heating or cooling of the skin interconnect member 20 can be achieved by pressing the skin benefit actuator 13, which can be a depressible button, a touch sensitive button, or a sliding button, and which closes a powered circuit inside handle 12 to a circuit inside the skin interconnect member 20. The handle 12 may hold a power source, such as one or more batteries (not shown) that supply power to the skin interconnect member 20. Heating or cooling of the skin interconnect member 20 can also be achieved passively such as by dipping or running the skin interconnect member 20 under water at a different temperature than ambient. In certain embodiments, the skin interconnect member 20 can comprise a metal such as aluminum or stainless steel. In certain embodiments, the skin interconnect member 20 can comprise a high capacity material such as metal or phase change materials. In certain embodiments, the skin interconnect member 20 can comprise high thermal conductivity materials such as copper, aluminum, or thermally conductive plastics such as COOLPOLY®. The razor handle 10 disclosed herein can include the skin interconnect member 20 disclosed co-owned, co-pending US application, which is hereby incorporated herein by reference.

Figure 3A:
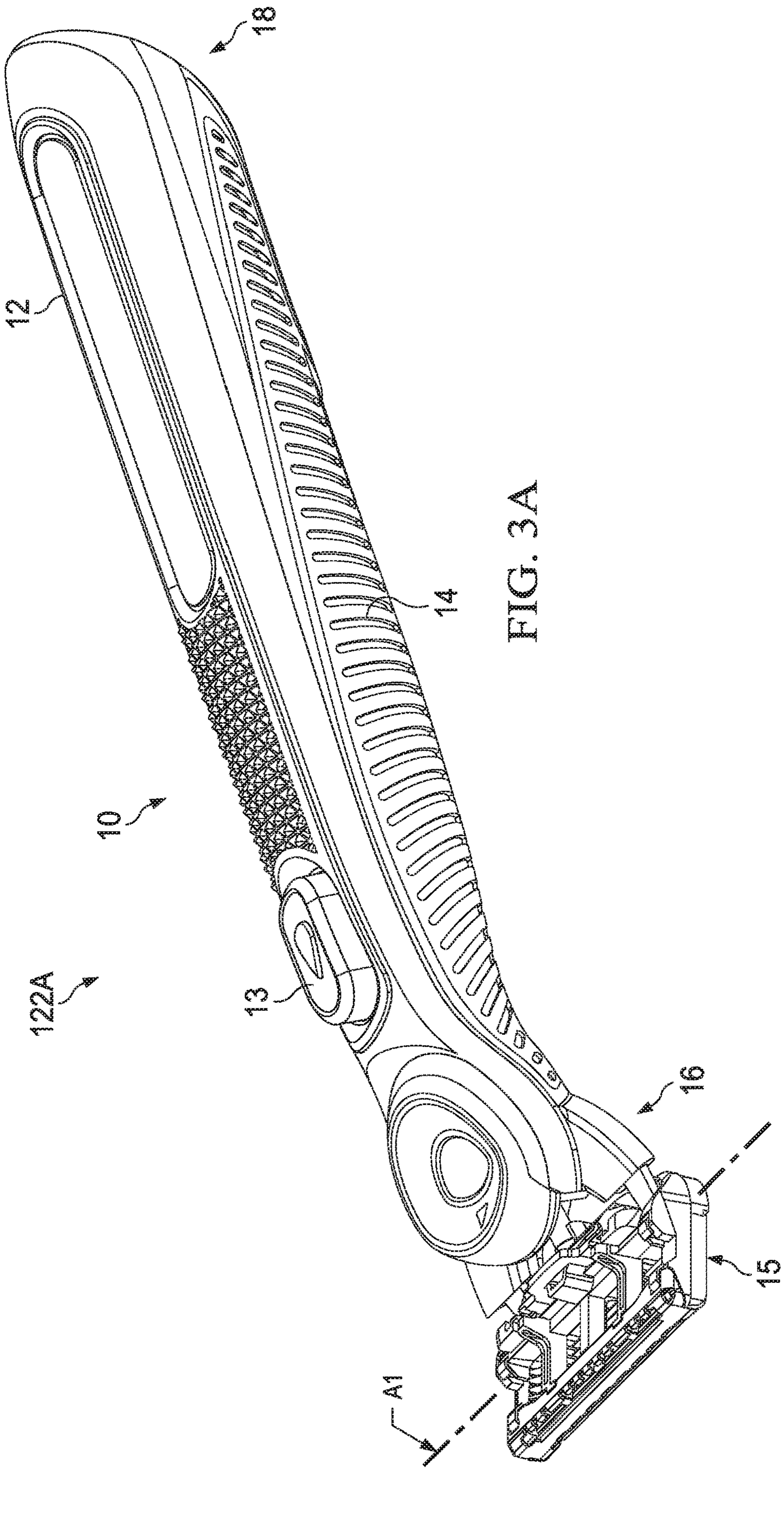
FIGS. 3A-B shows top and bottom perspective views of a shaving razor including at least one skin interconnect member for delivering fluid to provide a skin benefit in accordance with the present invention.
Figure 3B:
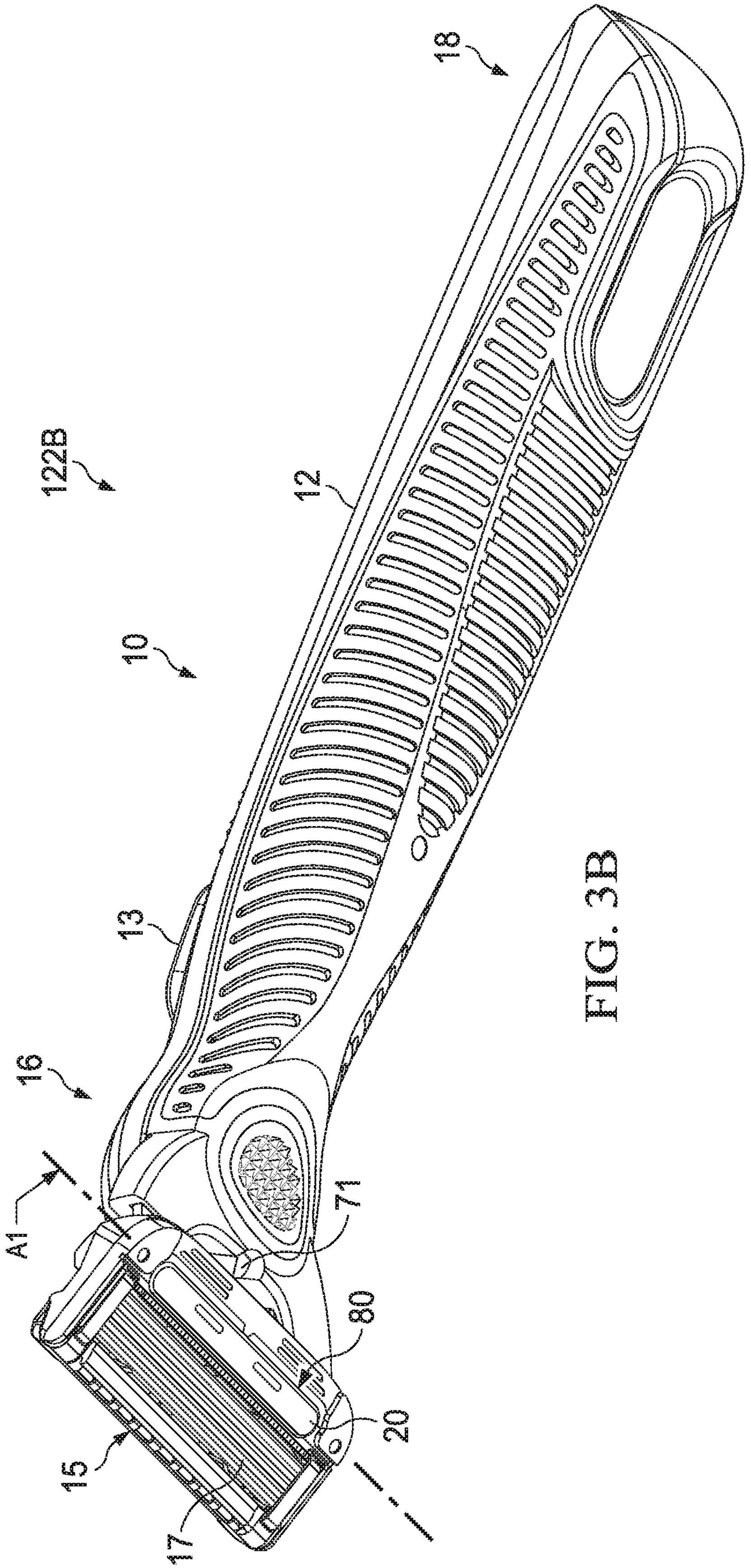
Figure 3C:
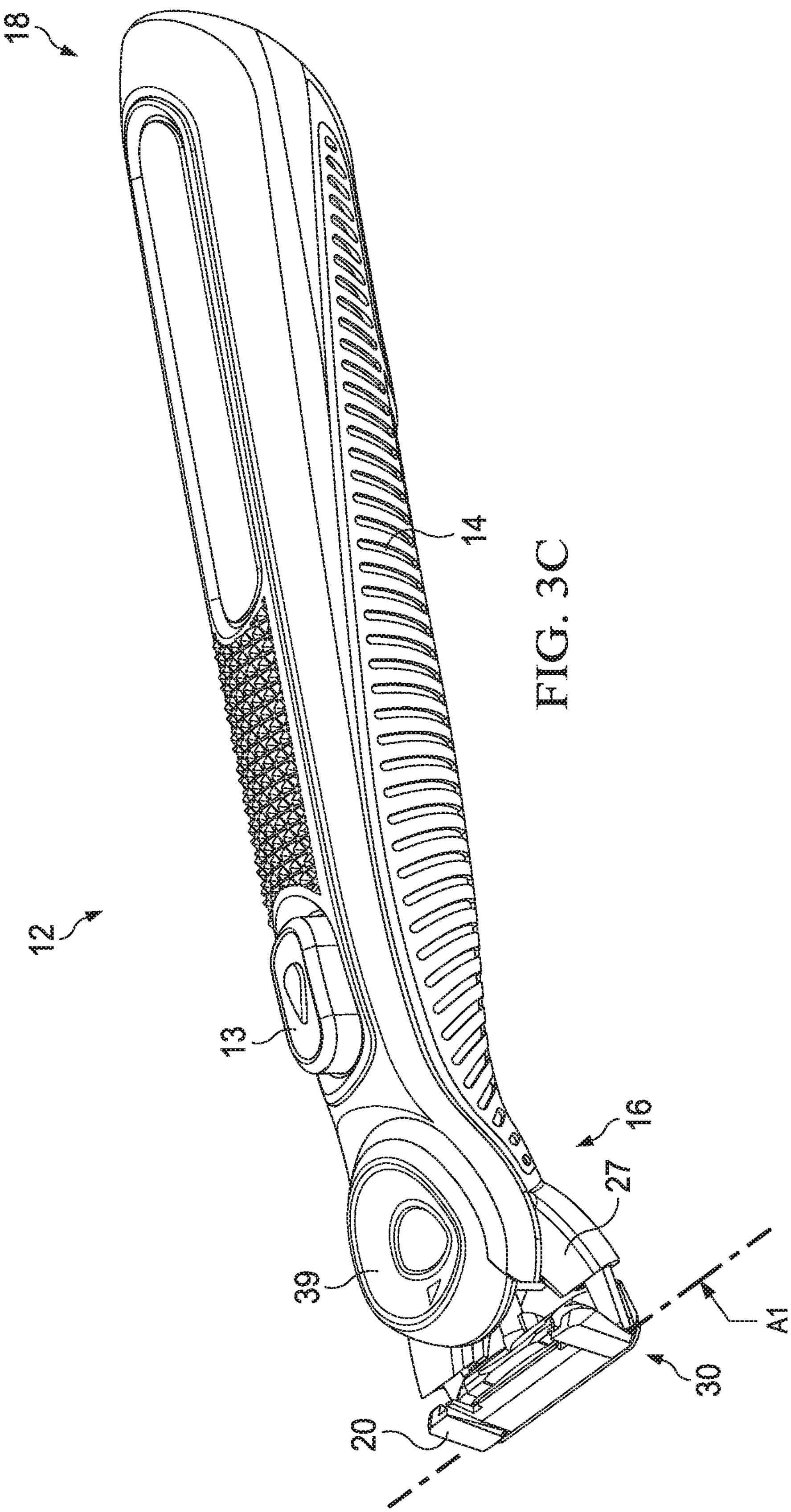
FIG. 3C is a perspective view of a shaving razor handle including at least one skin interconnect member for delivering fluid to provide a skin benefit in accordance with the present invention.
Figure 3D:
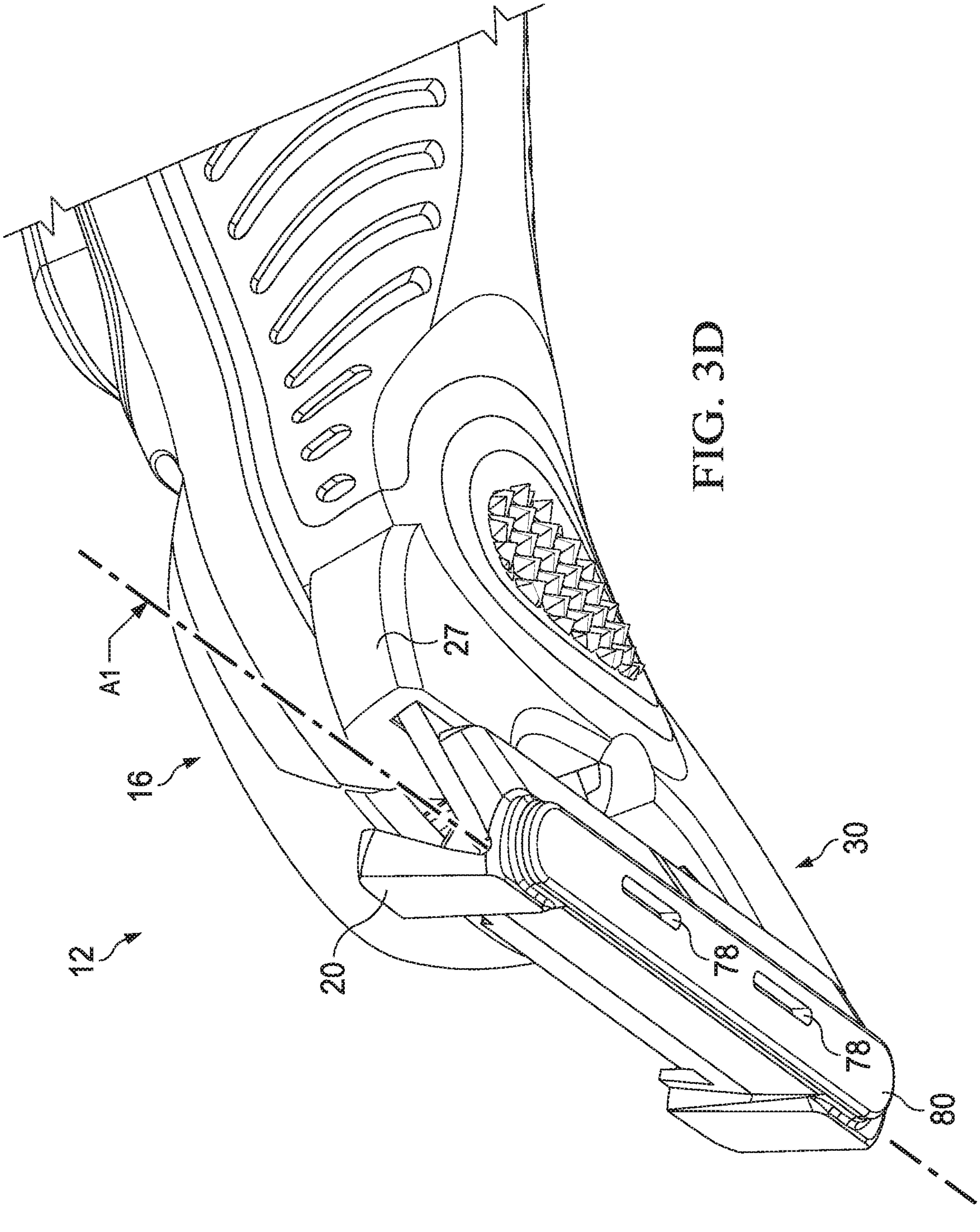
FIG. 3D is a close-up perspective view of the skin interconnect member of the handle of that is shown in FIG. 3B.
Figure 4A:
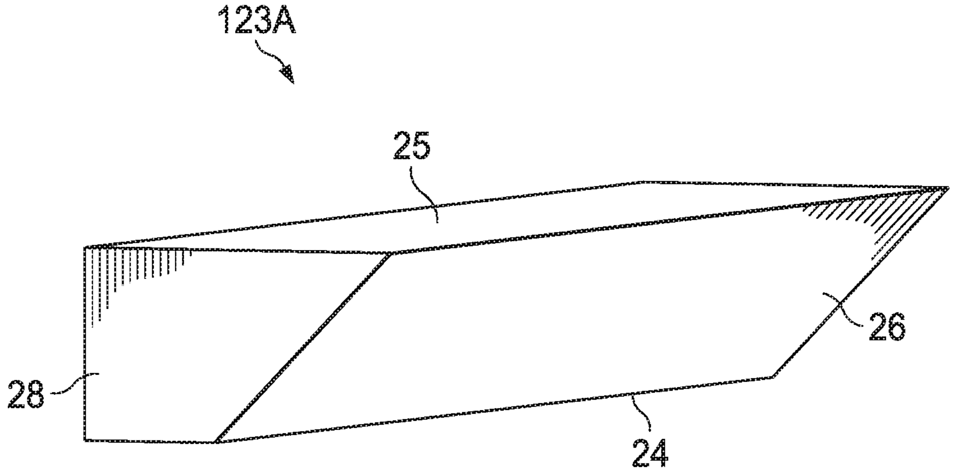
FIGS. 4A-4D shows schematic representations of a trapezoidal prism-shaped element of the present invention.
Figure 4B:
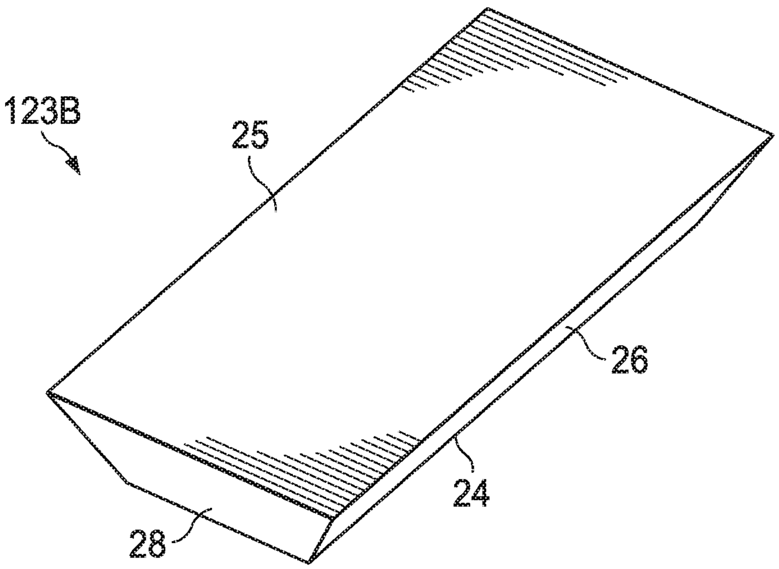
Figure 4C:
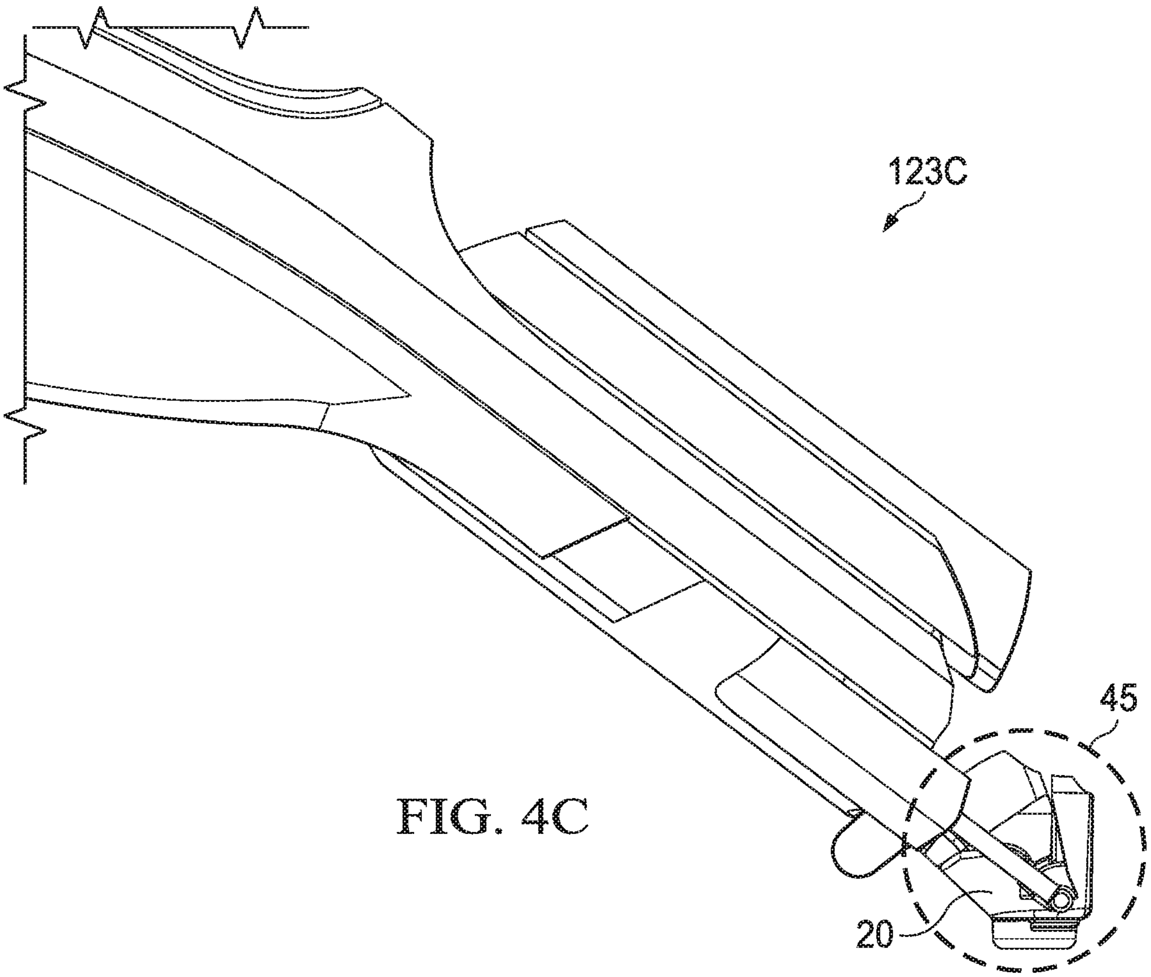
Figure 4D:
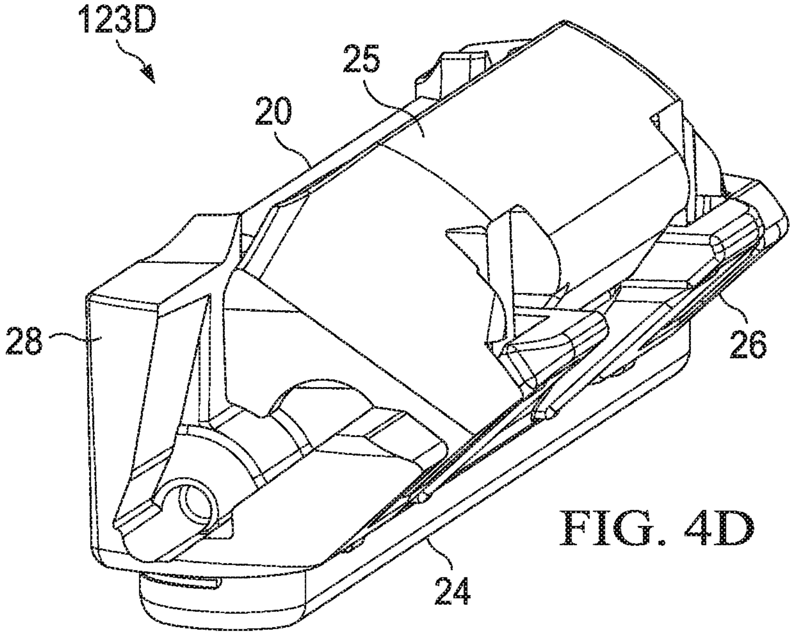

FIGS. 3A-3D show another embodiment of a shaving razor 10 that can provide a skin benefit by delivering a fluid to the skin of the user. In FIGS. 3A and 3B, views 122A and 122B provide top and bottom perspectives of this embodiment. This embodiment can have a handle 12, a blade cartridge unit 15 that can releasably attach to the handle 12 and can contain one or more blades 17, and a skin interconnect member 20 which can provide a skin benefit by delivering fluid to the skin of the user. The blade cartridge unit 15 may be detached using the cartridge eject mechanism 39 mounted at the proximal end 16 of the handle 12. In the embodiment shown, the razor handle 12 is configured to rotate the razor cartridge 15 about an axis of rotation A1 using pivot mechanism 30. Like skin interfacing surface 22 in FIG. 1A and thermal surface 112 in FIGS. 2B and 2D, a portion of the handle 12 can extend through blade cartridge unit 15 and be exposed as surface 80. Surface 80 is a surface of a skin interconnect member 20 and can have openings 78 through which a fluid can be dispensed for skin comfort during shaving. Fluid flow from the reservoir in handle 12 can be achieved by pressing the skin benefit actuator 13, which can be a depressible button, a touch sensitive button, or a sliding button which activates a pumping mechanism to push fluid towards and through the skin interconnect member 20. The pumping mechanism can include the compression of a fluid reservoir, actuation of a manual pump, or activation of a powered pump. The razor handle disclosed herein can include the skin interconnect member disclosed in co-owned, co-pending US applications, which are hereby incorporated herein by reference.

It should be understood providing consumer benefits from the handle 12 of the present invention solves the challenge of balancing designing a safe product with good product integrity (e.g., in cases of accidental drops), delivering the benefit from the handle 12 to skin interfacing surface 22 of the skin interconnect member 20 around the pivots needed for shave strokes to closely track the skin, and fitting the delivery benefit components among the other functional components of the handle 12 such as the cartridge eject mechanism 39 and pivot mechanisms 30 and 38 discussed in more detail below. Designing a safe product with good product integrity is a challenge because by having many, if not most, of the benefit delivery elements disposed in the handle in the present invention, the handle can weigh two to three times more than most wet shaving razor systems commonly found on the market. For instance, most existing shaving razor handles weigh less than 56 grams, and the vast majority weigh less than 45 grams. Handles that deliver consumer benefits of the present invention may have a mass up to about 120 grams with preferred mass about 80 grams. In some embodiments, the handle 12 may have a mass of about 57 grams to about 150 grams and more preferably about 80 grams. Such a handle is considered a "heavy" handle in the present invention. The handle embodiment shown in FIGS. 2A-2B has a mass about 75 grams and the handle embodiment shown in FIGS. 3A-3D. has a mass about 85 grams.

The razor cartridge 15 may connect to the handle 12 when the handle is brought in proximity to the razor cartridge and when the skin interconnect member 20 and razor cartridge opening 100 are aligned. This configuration prevents, inter alia, reverse connection of the razor cartridge to the handle. The configuration also facilitates, inter alia, quick, easy, intuitive, and safe connection of the razor cartridge to the handle.

The razor cartridge 15 of FIGS. 1A and 1B may be desirably releasably engaged with the skin interconnect member 20 to replaceably secure the razor cartridge 15 to the proximal end portion 16 of the handle 12. The razor cartridge may include a housing 32, a guard 34, a cap 36, and at least one blade 17. The at least one skin interconnect member 20 may be released from the razor cartridge 15 by the exertion of force. In addition, the at least one skin interconnect member 20 may be released by other suitable mechanisms or by other suitable mechanisms in combination with the exertion of force. The at least one skin interconnect member may be released from the razor cartridge via, for example, a mechanical release mechanism.

The mechanical release mechanism 39, shown in FIGS. 1A, 2A, and 3A for example, may extend from the proximal end portion 16 of the handle and comprise an eject button that may be included within a portion of the handle 12. The user may mechanically release the razor cartridge 15 from the at least one skin interconnect member 20 by pushing or actuating the button. The mechanical cartridge release mechanism 39 may then, for example, push on the at least one skin interconnect member 20. The razor cartridge 15 will no longer connect with the at least one skin interconnect member 20. The razor cartridge 15 may then be released from the handle 12.

Most existing razors have a mechanical cartridge release mechanism 39 mounted within a millimeter of the razor cartridge 15 when attached to the handle 12 and require the eject button to travel less than 2.5 mm to detach the cartridge 15. Unlike existing razors, the mechanism 39 of the razor 10 shown in FIG. 1A is mounted about 3 mm from the razor cartridge 15 and requires an eject button to travel about 5 mm to detach the cartridge.

The skin interconnect member 20 has a desirable length from about 20 to about 40 mm and a width of about 2 mm to about 5 mm. The skin interconnect member 20 desirably has a volume greater than about 300 $mm^3$. The length and width and minimum volume are feasibly chosen to provide enough area and volume for the consumer benefit to be delivered effectively to a user's skin. The top surface area 22 of the skin interconnect member 20 ranges from about 40 $mm^2$ to about 120 $mm^2$, preferably about 80 $mm^2$ to about 85 $mm^2$.

The at least one skin interconnect member 20 may be comprised of any suitable size and shape. For example, the at least one skin interconnect member 20 may comprise a curved surface, a flat surface, or any combination thereof. The at least one skin interconnect member 20 can have a shape beneficially conducive to both attaching to the blade cartridge unit 15 and facilitating the delivery of a skin comfort benefit from the handle 12 to and through a blade cartridge unit 15 attached to the handle 10.

The shape of the at least one skin interconnect member 20 can alternatively be described as a "funnel," or as "tapered," or a "trapezoidal prism-shaped." As understood from the description herein, the description "trapezoidal prism" is general with respect to an overall visual impression the pivoting head. For example, FIG. 4A-D shows schematic representations 123A and 123B of trapezoidal prism-shaped elements and shows a shape having a relatively wide upper face (or opening) 25, a relatively narrow lower face 24, two long major faces 26, and two end faces 28 that are generally trapezoidal-shaped. FIG. 4 also shows a close-up side view 123C of one embodiment of the skin interconnect member 20 of the handle of the present invention showing a generally trapezoidal prism or prism-like shape 45 of the skin interconnect member 20 and an isolated view 124D of components of one embodiment of skin interconnect member 20 that create a general "trapezoidal prism" shape.

The description "trapezoidal prism" is used herein as the best description for the overall visual appearance of the skin interconnect member but the description does not imply any particular geometric or dimensional requirements beyond what is described herein. That is, the skin interconnect member, including the cover member, need not have complete edges or surfaces. Further, edges need not be unbroken and straight, and sides need not be unbroken and flat. Alternately, a trapezoidal prism, or prism-like shape may generally signify a multiple-sided body where one pair of opposing faces tapers from a larger size to a smaller size. The larger size face is desirably disposed towards a handle and the smaller size face is desirably disposed towards a razor cartridge. In this way, a tapered shape of the skin interconnect member in an embodiment of the present invention is desirably coupled with a corresponding tapered shape in the razor cartridge to engage the handle with the cartridge. The corresponding shapes are more intuitive for users, can allow for better attachment and detachment, and can require lower forces during attachment and detachment while also allowing for good retention during shaving and trimming. Due to the cartridge surface area being smaller (e.g., at the top surface of the skin interconnect member), a tapered shape for the skin interconnect member can provide for a larger volume and thus, a larger benefit for the user.

Also contemplated are any other feasible shapes, prism and otherwise, such as a triangular prism, a sphere, an ellipsoid, a cylinder, a quadrilateral, a parallelogram, a rectangle, a square, a bar, or any combination thereof.

To join or mate the handle to the razor cartridge, the cartridge desirably has a corresponding shape that is similar to that of the skin interconnect member within which the skin interconnect member is disposed. The skin interconnect member may latch to the razor cartridge to secure the handle to the cartridge. In one embodiment, the razor cartridge is releasably engaged with the at least one skin interconnect member to replaceably secure the razor cartridge to the proximal end portion of the handle.

Figure 5A:
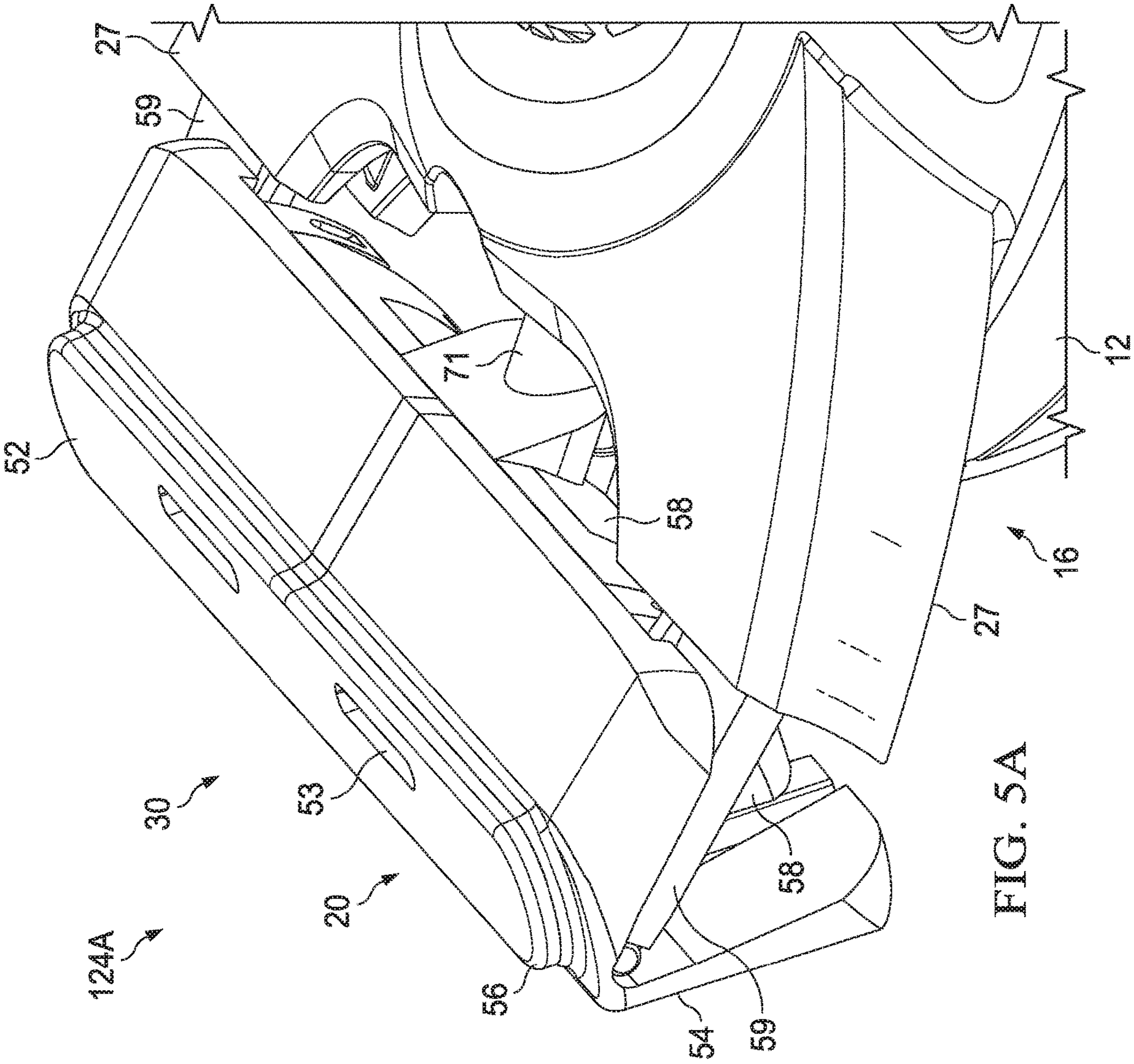
FIGS. 5A-5B shows close-up perspective and exploded views of the skin interconnect member of the present invention.
Figure 5B:
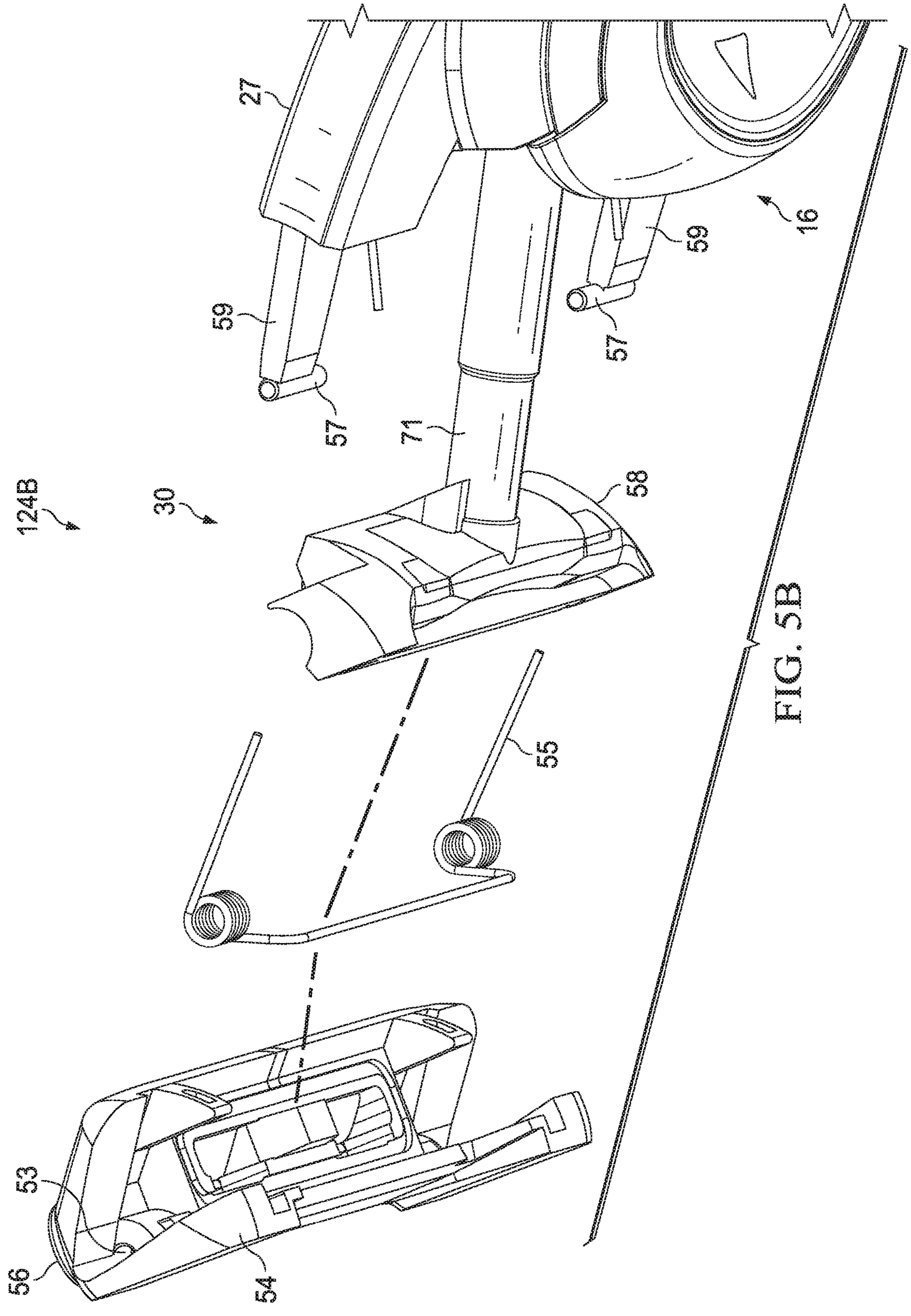
Figure 13A:
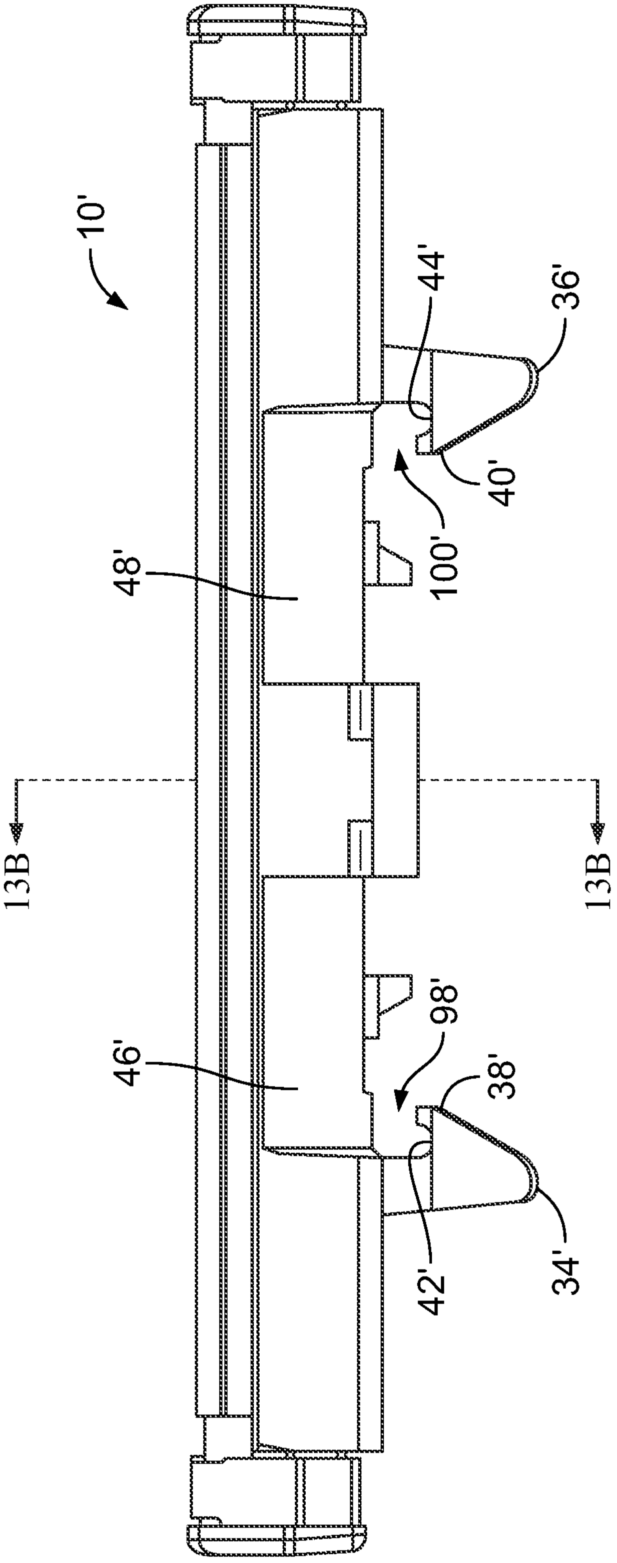
FIG. 13A (Prior Art)
FIG. 13A is a rear elevation view of a prior art razor cartridge.
Figure 13B:
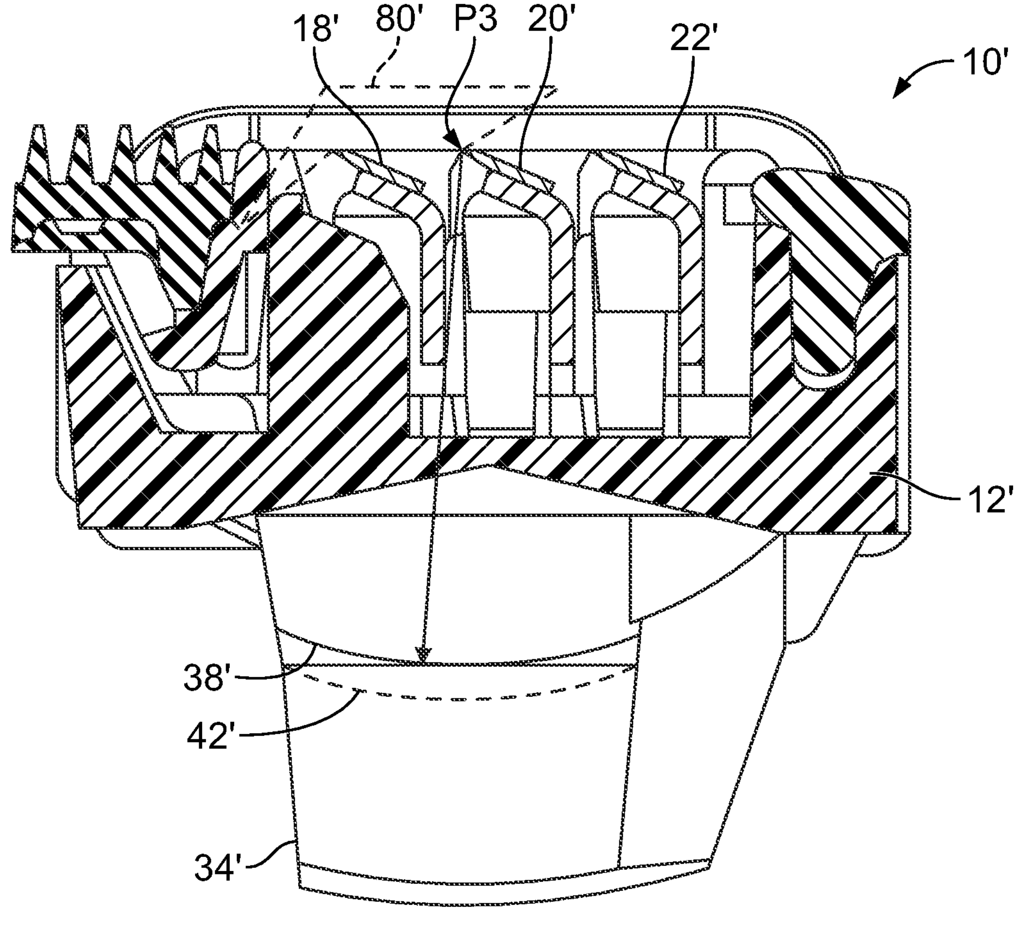
FIG. 13B (Prior Art)
FIG. 13B is a cross-sectional view of the razor cartridge of FIG. 13A taken at 13B-13B of FIG. 13A.

In FIGS. 5A-B, components of the skin interconnect member 20 and the pivoting mechanism 30 that enable rotation about axis A1 for the embodiment are shown in more detail. The embodiment shown is the razor handle 12 of FIGS. 3A-3D. In close-up view 124A and exploded view 124B, the skin interconnect member 20 includes a base element 58 and a cover 54 and the cover 54 is disposed over a base 58. The cover 54 comprises a top surface 52 which may be a planar application surface for application of a benefit such as fluid or thermal benefits to a user's skin (e.g., via a cartridge). Top surface 52 may have a rim 56 along its perimeter. The rim feature is used as an engagement feature to mate with the cartridge. Additionally, or alternatively, one or more ports 53 may be disposed on the application surface for a fluid to be dispensed therethrough. The handle 12 desirably has a pair of proximal arms 27 at a proximal end 16 and the skin interconnect member or the handle may include a pair of bracket arms 59 connected to these proximal arms 27. Exploded view 124B of FIG. 5B shows that the pivot mechanism 30 for the skin interconnect member 20 to provide motion around axis A1 relative to the handle 12 desirably comprises a bearing surface 53 (e.g., recessed portion, cavity) within the skin interconnect member 20 and a corresponding bearing surface 57 on one or more arms 59 and a spring return element 55 having one or more springs. The motion around this and other axes (e.g., rotational axis A4 or rotational axis A3 which is discussed in more detail later) in the present invention may be enabled by bearings which may lie directly along an axis such as pin bearing or a shaft, or they may offset from the axis of rotation, creating by a virtual pivot. Virtual pivot bearings include shell bearings and linkages. FIGS. 13A and 13B depict an exemplary prior art razor cartridge 10' with a virtual pivot point P3, as disclosed in U.S. Pat. No. 5,661,907. The razor cartridge 10' includes a housing 12' with blade members 18', 20', 22' mounted therein. Extensions 34', 36' carry inwardly extending opposed curved rails 38', 40' having respective curved surfaces 42', 44'. The rails 38', 40', in conjunction with curved undersurfaces 46', 48' of the housing 12', define arcuate slots 98', 100' adapted to cooperate with known components on a razor handle (not shown), such as shell bearings, to facilitate pivotal connection of the razor cartridge 10' to the handle. As shown in FIG. 13B, the curved surfaces 42', 44' of the rails 42', 44' and the undersurfaces 46', 48' of the housing 12' have radii of curvature about the pivot point P3 located at a cutting edge of the second blade 20'. In general, the pivot point P3 may be located in a region defined by boundary 80' shown on FIG. 13B in dashed lines so long as the radius of curvature is maintained without interfering with necessary structures. The boundary 80' may extend from a cutting edge of the first blade member 18' to the cutting edge of the second blade member 20'; upward and rearward from the cutting edge of the second blade member 20' to above an upper surface (not labeled) of the housing 12' at a location in front of a cutting edge of the third blade member 22'; along (and slightly above) the upper surface of the housing 12' to a position in front of the first blade member 18'; downward and forward to a location within a guard member (not labeled) below and forward of the cutting edge of the first blade member 18'; and from the location within the guard member upward and rearward to the cutting edge of the first blade member 18'.

The at least one skin interconnect member 20 may be in pivotal relation to the proximal end portion 16 of the handle 12 by, for example, by creating a pivot mechanism by assembling individual components as shown in FIG. 5, by creating a flexural pivot using a technique such as co-injection molding the at least one skin interconnect member with the handle or a portion of the handle, or by creating a bearing by press fitting or force fitting the skin interconnect member into the handle or vice versa.

In FIGS. 6A-6D a graphical layout of the razor 10 is shown with the handle 12 and the blade cartridge unit 15 of the present invention in an un-deflected, unloaded rest position. In general, the skin contacting surface 67 of the blade cartridge unit 15 usually lies on or within a few millimeters of a cartridge plane PL1 when the blade cartridge unit 15 is at its rest position. In general, a plane PL2 may be oriented at an angle to the cartridge plane PL1 that lies along an approximate mid-plane of the handle main body 21. This PL1-to-PL2 included angle between planes PL1 and PL2 may range from about −60 degrees to about +90 degrees. A narrower preferential range of the PL1-to-PL2 included angle is about −45 degrees to about +45 degrees. The figures of the present invention show a PL1-to-PL2 included angle about +16 degrees. In general, a plane PL3 may be oriented at an angle to the main handle body 21 midplane PL2 that lies along an approximate mid-plane of the handle neck area 23. This PL2-to-PL3 included angle between planes PL2 and PL3 may range from about −100 degrees to about +100 degrees. A narrower preferential range of the PL2-to-PL3 included angle is about −45 degrees to about +90 degrees. The figures of the present invention show a PL2-to-PL3 included angle of about +21 degrees. In general, a plane PL4 can be defined perpendicular to planes PL1, PL2, and PL3 that lies longitudinally along the handle 12 at the approximate mid-plane of the handle 12 and the blade cartridge unit 15.

Figure 6A:
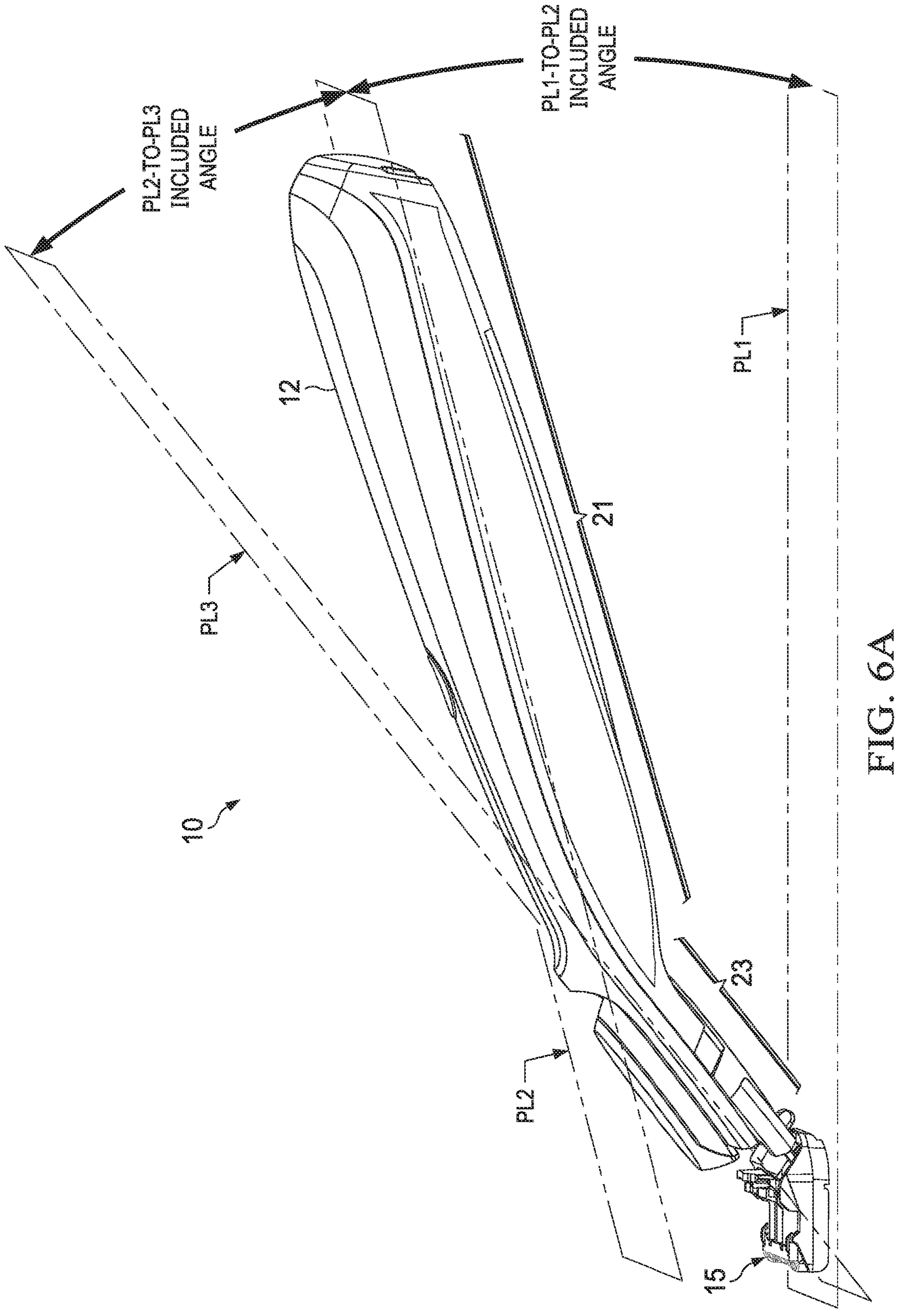
FIGS. 6A-6D are perspective views of a shaving razor system showing axes of movement and graphical layout of the razor of the present invention.
Figure 6B:
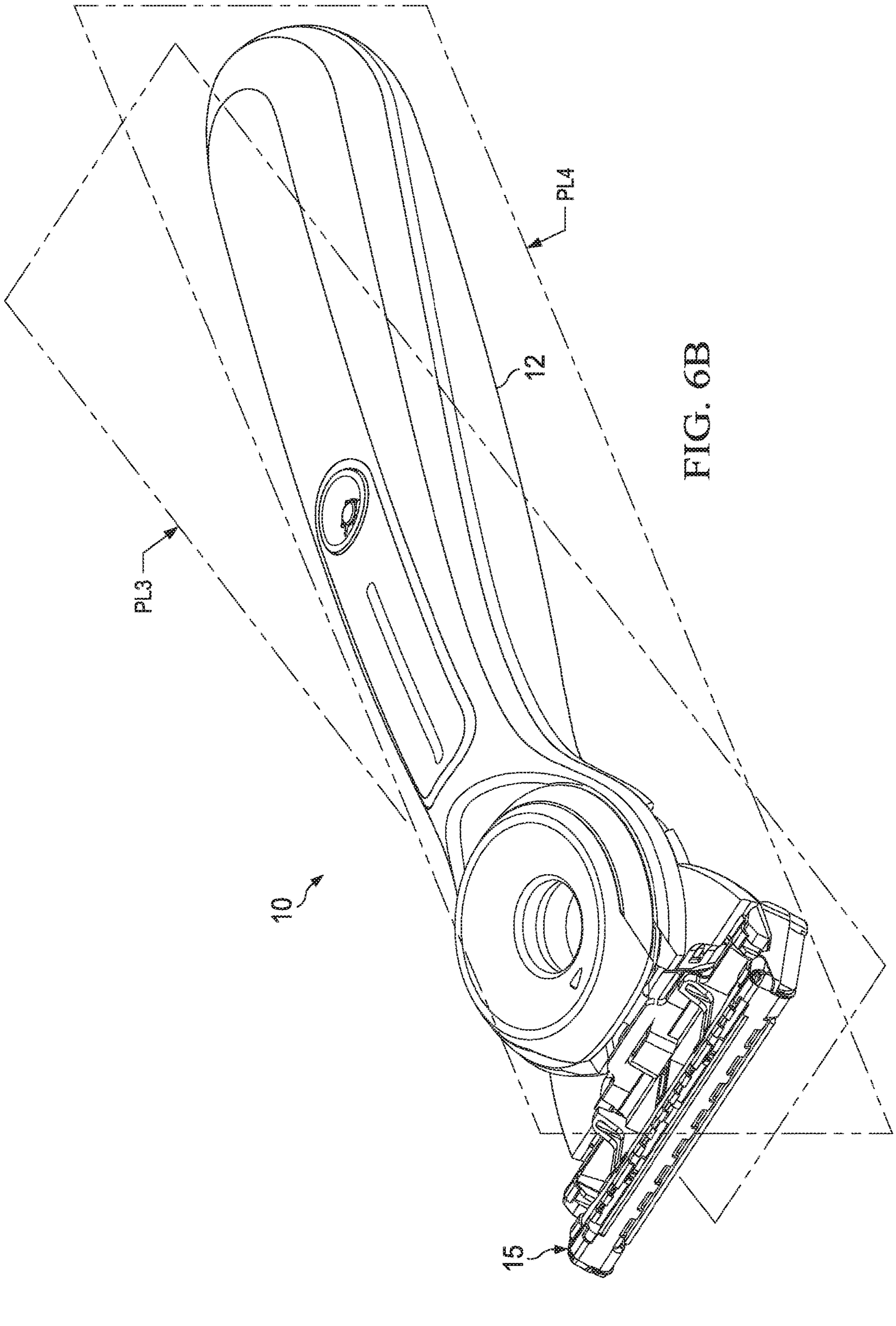
Figure 6C:
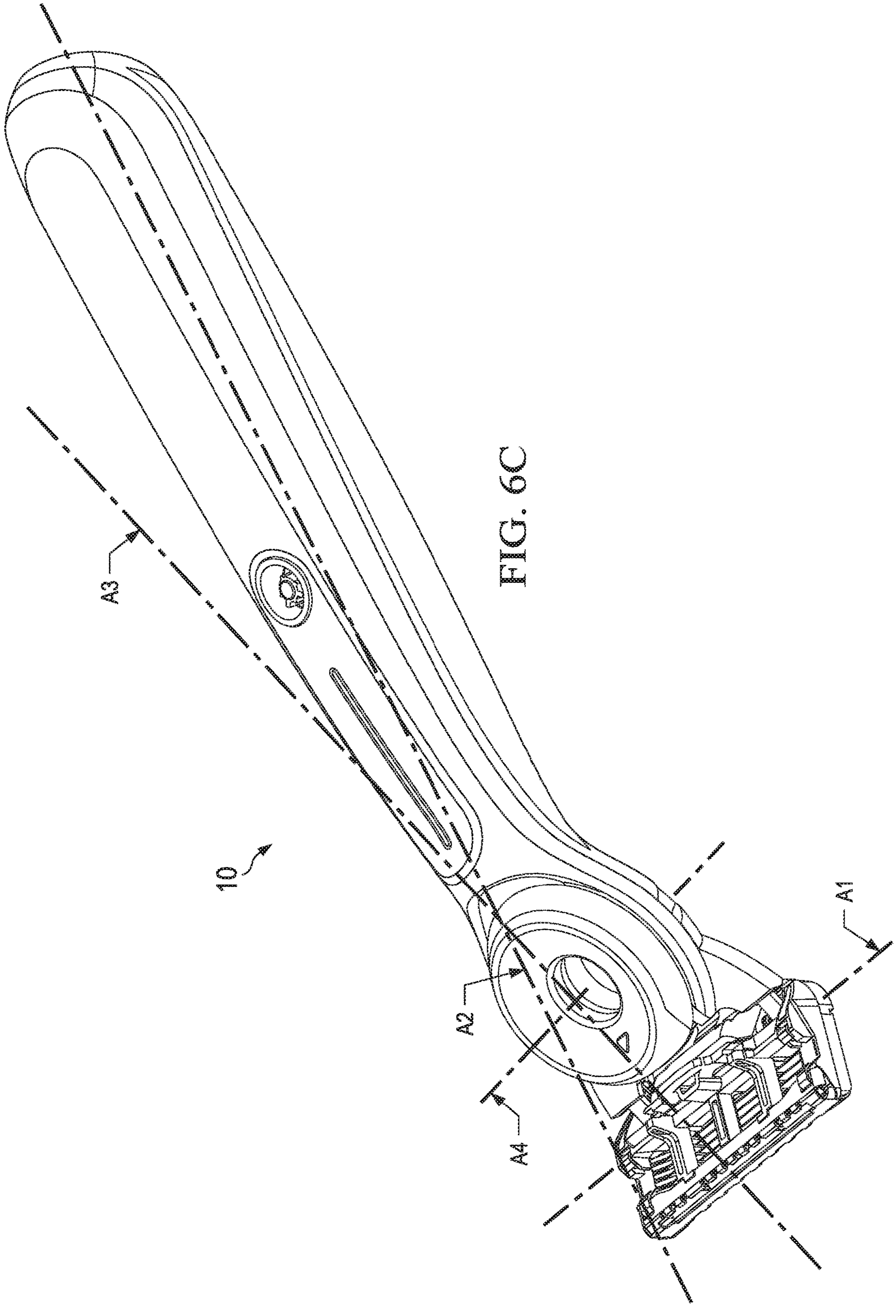
Figure 6D:
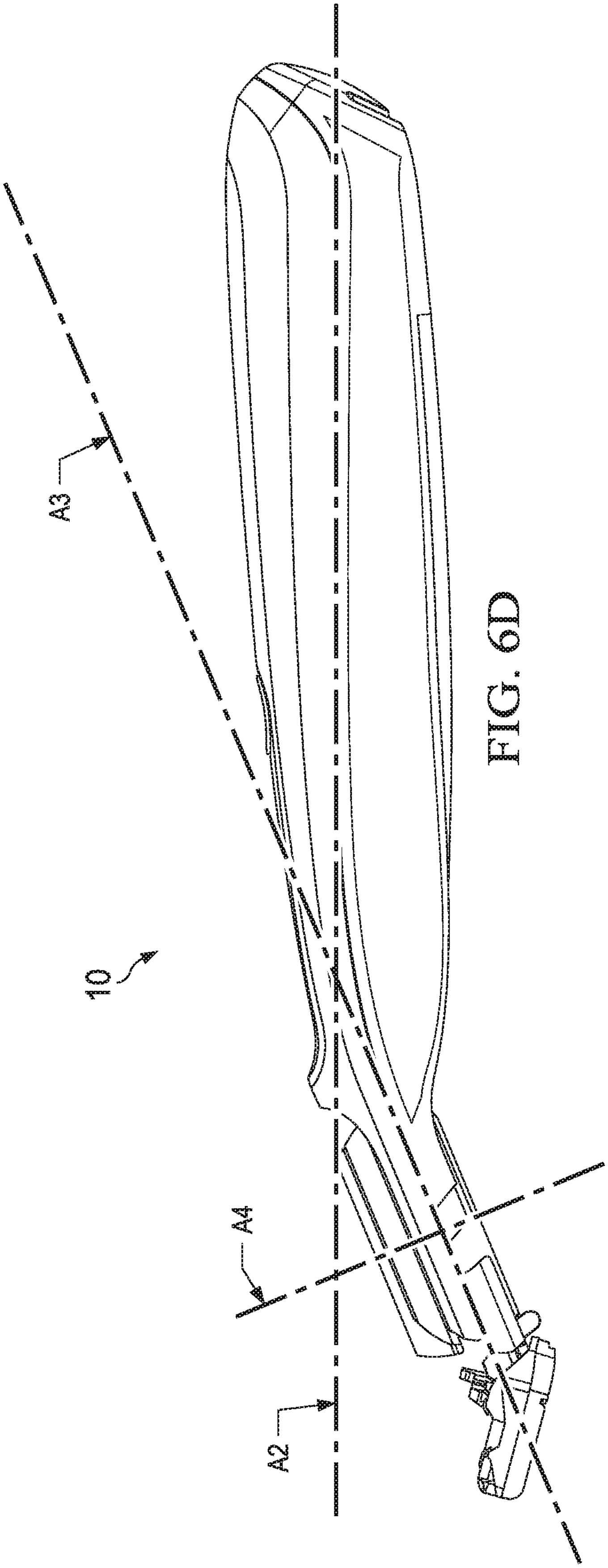

As shown in FIGS. 6C-6D additional axes of rotation or directions of linear motion for various components of the handle of the present invention can be generally defined using PL2, PL3, and PL4. An axis A2 along the handle main body 21 can be defined as the intersection of planes PL2 and PL4; and an axis A3 along the handle neck area 23 can be defined as the intersection of planes PL3 and PL4. Another axis A4 within the handle neck area 23 can be defined perpendicular to plane PL3 and laying upon plane PL4. Another axis A5 within the handle main body 23 can be defined perpendicular to plane PL2 and laying upon plane PL4 as shown later in FIG. 12A and FIG. 12B.

As shown in FIGS. 2C-2D, 3C-D, and 5A-5B, the pivot mechanism 30 (e.g., spring return element, bracket arms) that provides a pitch type movement about pivot axis A1 is most proximal to the skin interconnect member 20. In accordance with the present invention, the handle 12 and the skin interconnect member 20 may rotate around other axes in addition to axis A1 as shown in FIG. 6C. Other embodiments may be configured to rotate the skin interconnect member about axes A1, A2, A3, A4, A5, or any combination thereof. For instance, axes of rotation in a shaving razor relative to the handle include not only a pitch type motion about axis A1, but also a roll motion about axes A2 or A3 and yaw motion about A4 or A5 as shown in FIGS. 6C-6D and FIGS. 12A and 12B.

In one embodiment shown in FIGS. 1A and 2B, the pivot mechanism 38 that provides the side to side (yaw) type rotational movement of the skin interconnect member relative to the handle along Axis A4 comprises a bottom pod 19 with a spring return element (e.g., a spring, disposed within pod, not shown). Similar movement is found in the GILLETTE® Flexball™ razor. In another embodiment, a structure that provides an alternative roll rotational movement of the skin interconnect member relative to the handle along axis A3 may comprise a rolling mechanism such as found in the Gillette® Venus® Swirl™ razor.

Figure 7:
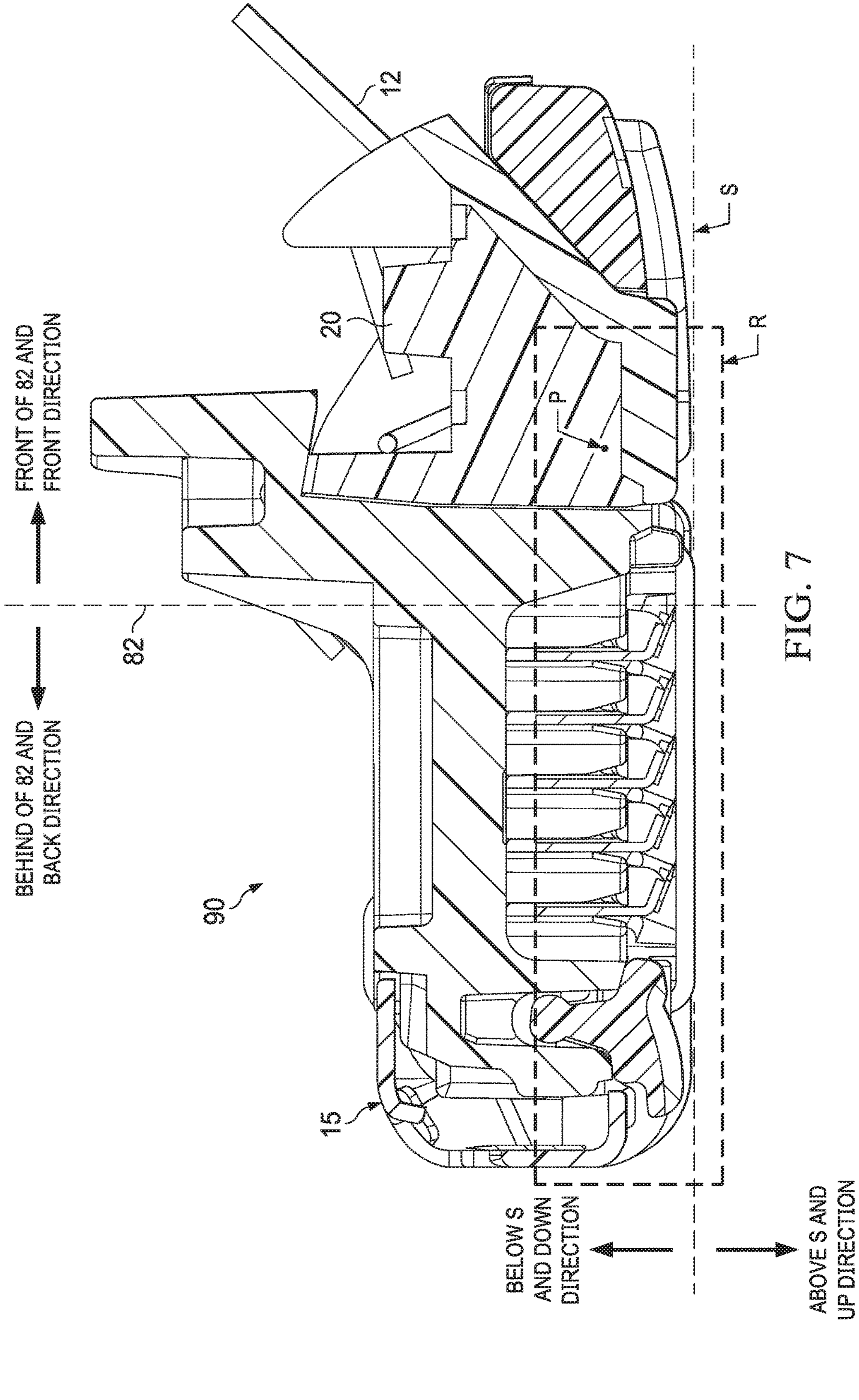
FIG. 7 is a cross-sectional view of the razor system showing a pivot point region in accordance with the present invention.

FIG. 7 is a cross-sectional view 90 of the razor system 10 showing a pivot point region R in accordance with the present invention. The skin interconnect member 20 is joined or latched to the razor cartridge 15 to secure the handle 12 to the cartridge. As depicted, the front direction is toward the front of the cartridge (e.g., towards the front blade) while the back direction is towards the back side of the cartridge (e.g., towards the lubricating strip). Further, the upwards direction is directionally towards the top surface of the cartridge while the downwards direction is directionally towards the bottom surface of the cartridge. A pivot point is generally a point on an axis of rotation. In this embodiment, pivot point P is disposed on a location of the pivot axis A1 that is generally transverse to the longitudinal axis A2 or longitudinal axis A3 of the handle 12 when the razor cartridge 15 is its rest position. The pivot point P is also disposed on the mid-plane PL4 of the handle main body 21 and the razor cartridge 15 in its rest position perpendicular to this axis A1. For good shave performance, the pivot point P is preferably located in a region R which is up to about 3.5 mm in front of the front blade edge 82, up to about 11 mm behind the front blade edge, up to about 1 mm above the shave plane S, and up to about 2.5 mm below the shave plane S. The portion of the region R above the shave plane S is generally a portion that is disposed into the skin. The portion of the region R below the shave plane S is generally a portion that is disposed away from the skin. A pivot point location outside of the razor cartridge or the skin interconnect member may be created by a virtual pivot.

Figure 8:
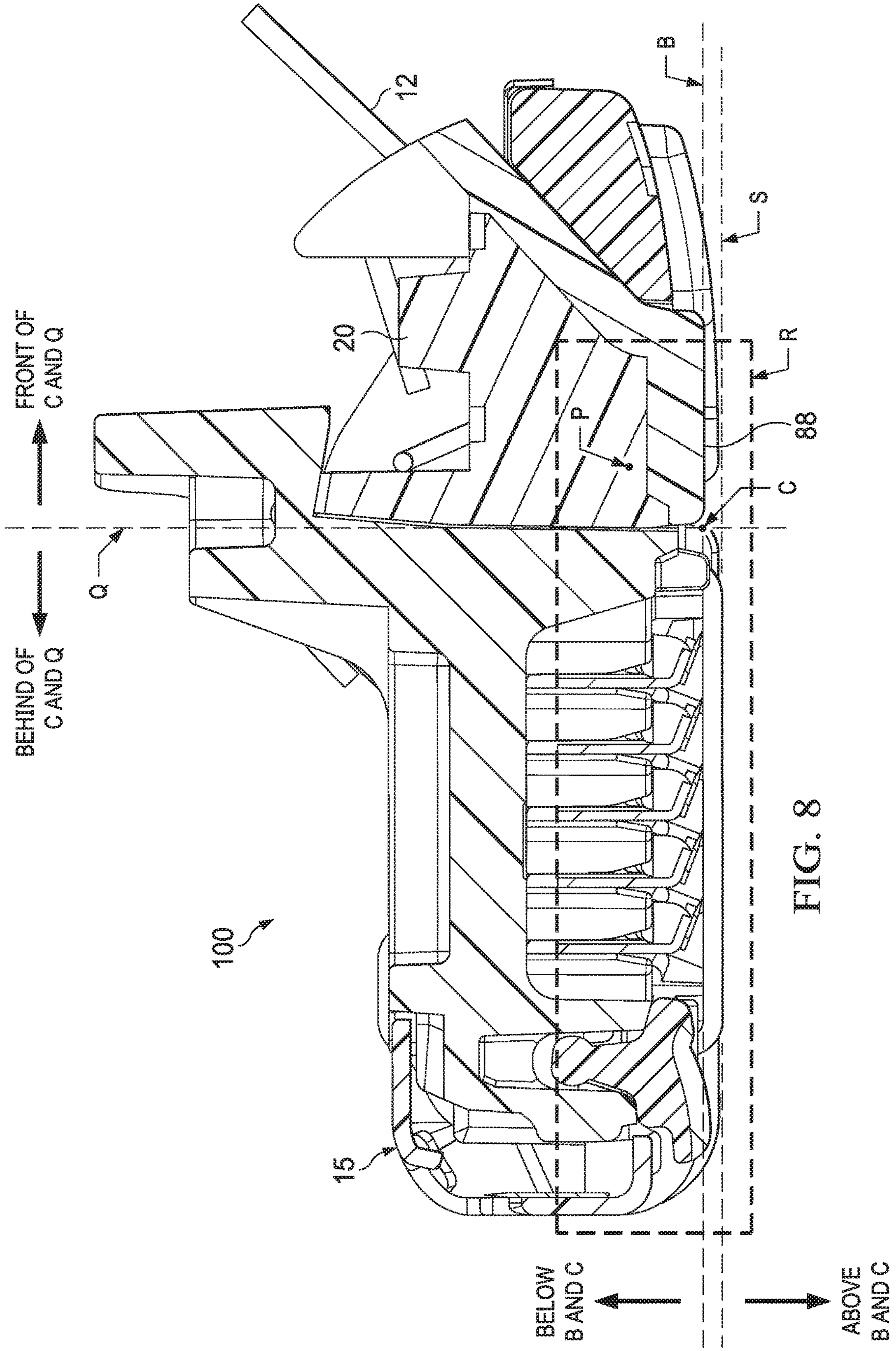
FIG. 8 is a cross-sectional view of the skin interconnect member showing a pivot point region in accordance with an alternate embodiment of the present invention.

FIG. 8 depicts a cross-sectional view of a razor system 100 having an application surface plane B at the top surface 88 of the skin interconnect member 20. Plane B is substantially parallel to shave plane S at the top surface 88 of the skin interconnect member 20. A plane Q perpendicular to the shave plane S intersects plane B at point C. In one embodiment shown in FIG. 9, distal point C is desirably at a rear corner of the skin interconnect member's top surface 88. Pivot point P is in the same location as in FIG. 8.

Figure 9:
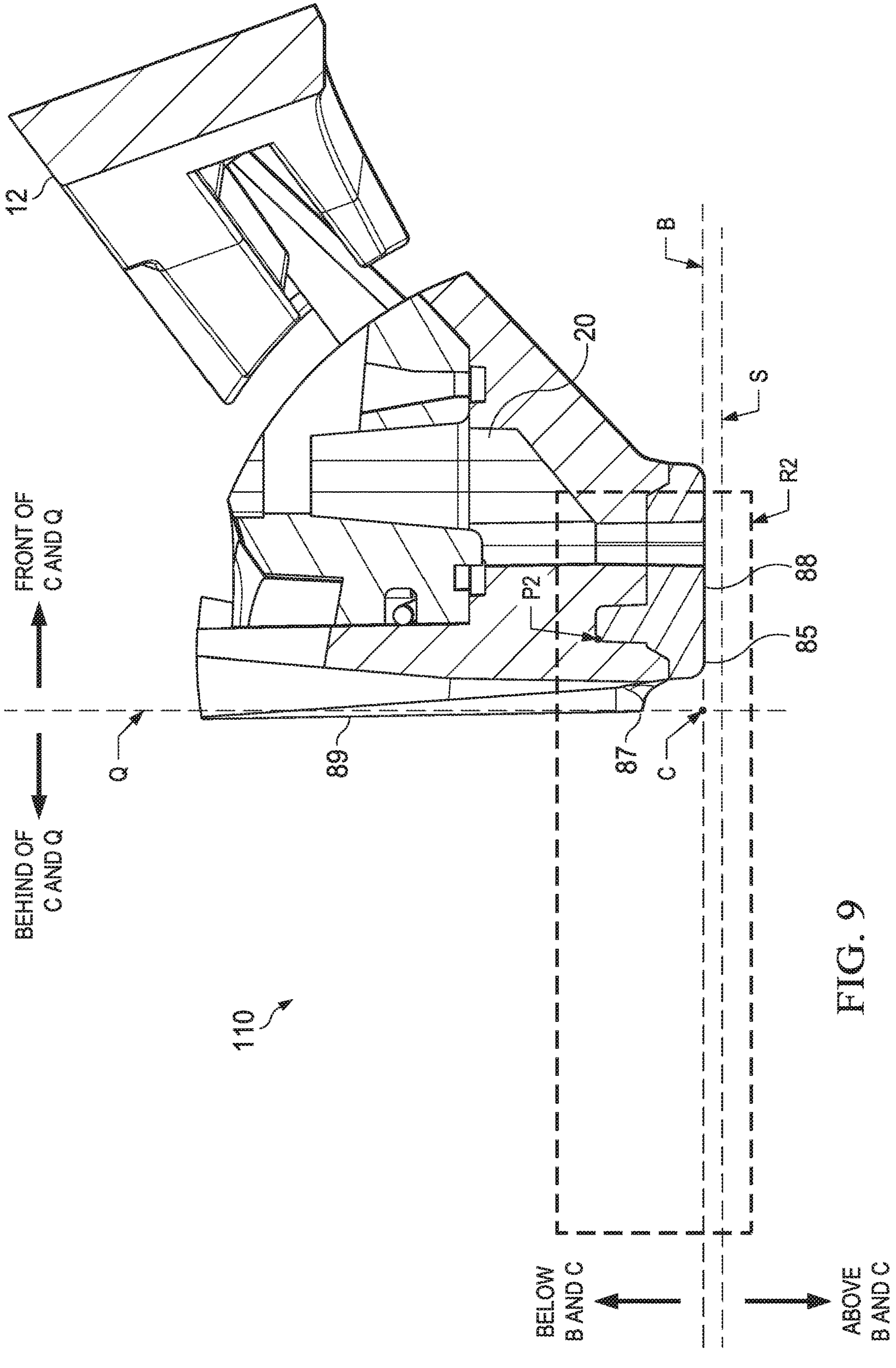
FIG. 9 is a cross-sectional view of the skin interconnect member showing a pivot point region of FIG. 8.
Figure 10A:
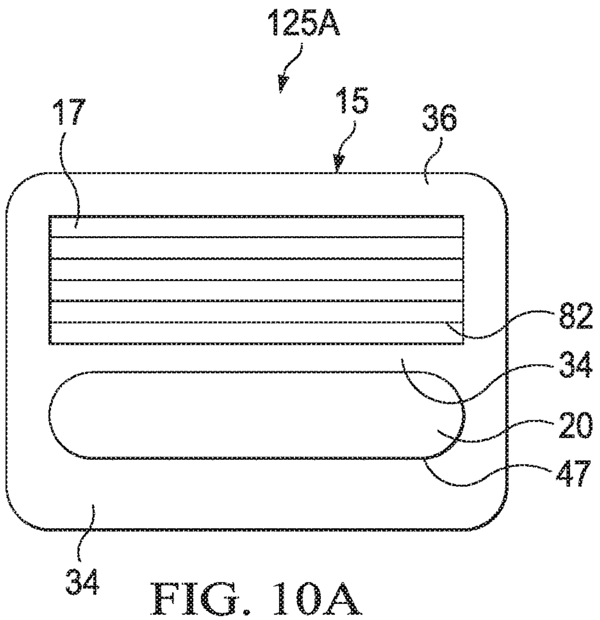
FIGS. 10A-10H shows schematic representations of the top surface of the razor cartridge and skin interconnect member of the present invention.
Figure 10B:
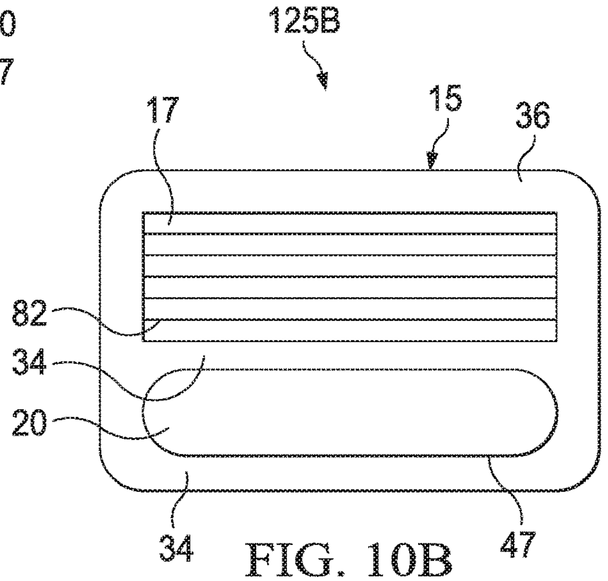
Figure 10C:
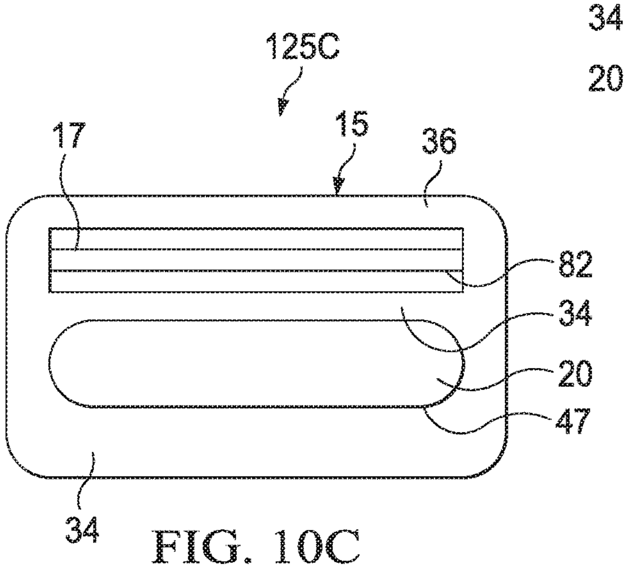
Figure 10D:
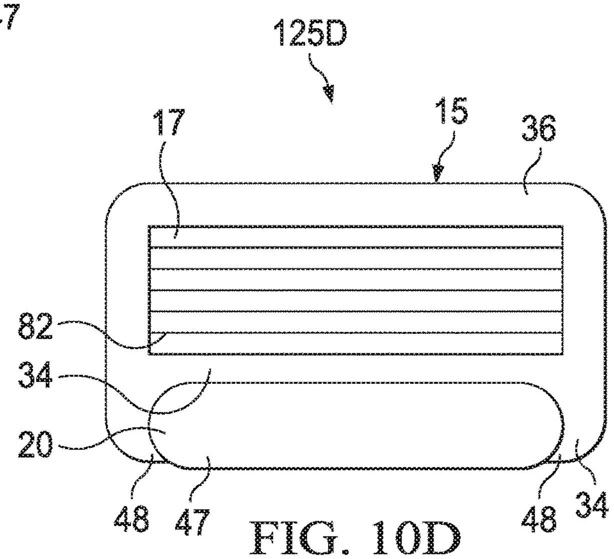
Figure 10E:
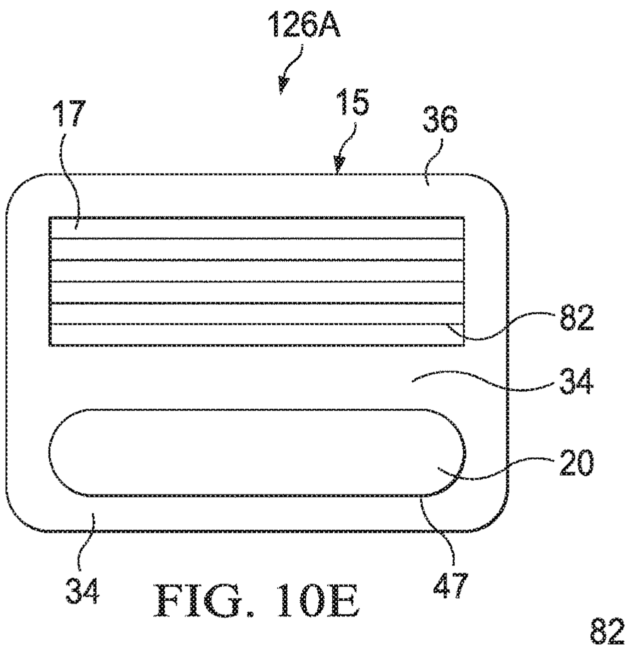
Figure 10F:
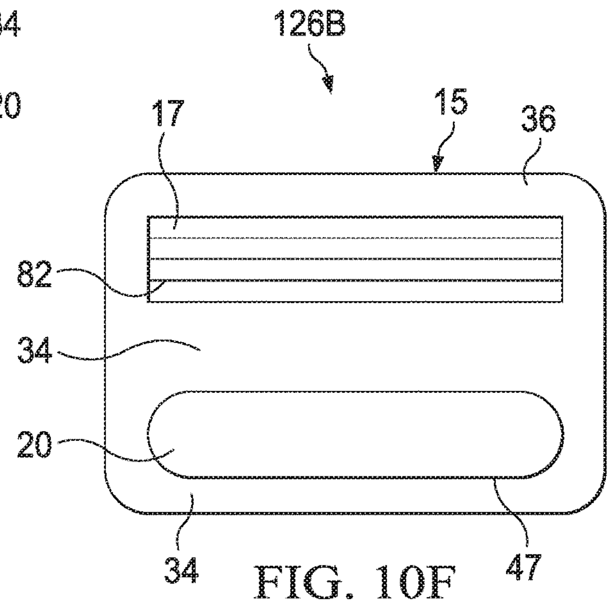
Figure 10G:
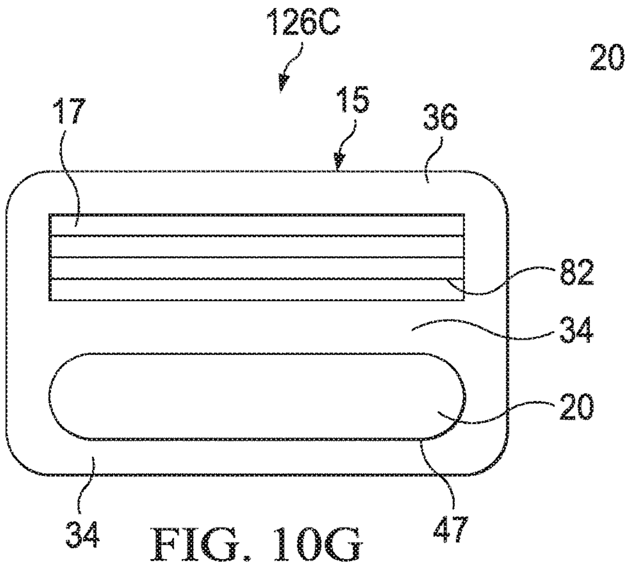
Figure 10H:
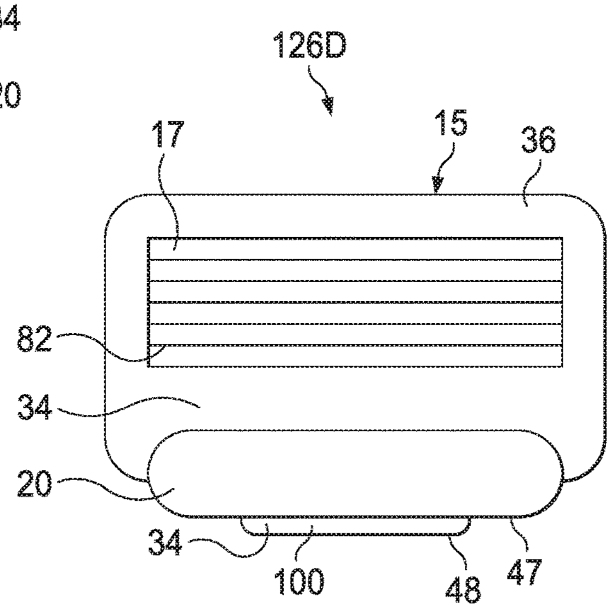

FIG. 9 depicts an alternative cross-sectional view 110 of the system of FIG. 9 showing the skin interconnect member 20 and handle 12, but without the razor cartridge 15. As in FIG. 8, skin interconnect member 20 includes an application surface plane B that is substantially planar to the top surface 88 at a top most point 85. Point C is formed at the intersection of Plane B and Plane Q. Plane Q is defined as perpendicular to plane B and lies on the rearward most point 87 closest to the rear surface 89 of the skin interconnect member 20 wherein the point 87 is within 2 mm of plane B. Preferably, plane B is substantially parallel to the shave plane S of the handle's corresponding razor cartridge. Point C may or may not be disposed on the skin interconnect member or the razor cartridge in the present invention. In the embodiment shown in FIG. 10, point C is not a physical point on a surface of the skin interconnect member 20. It is noted that pivot point P2 appears in the same location as in FIG. 8 but the pivot mechanism about pivot point P2 is not formed by any cartridge components, is not formed by joining the cartridge 20 to the handle 12, but rather the pivot point P2 is formed completely by components contained within the handle.

For good shave performance, the pivot point P2 is preferably located in a region R2 which is up to about 2.00 mm in front of point C (towards the front side of the cartridge), up to about 12.5 mm behind point C, up to about 2 mm above the member plane B, and up to about 2.5 mm below the member plane B. The portion of the region R2 above the member plane B is generally a portion that is disposed into the skin. The portion of the region R2 below the member plane B is generally a portion that is disposed away from the skin. A pivot point location outside of the razor cartridge may be created by a virtual pivot.

To meet the different habits, behaviors, and shaving benefit preferences of consumers, a razor system array that comprises variety of razor handles, and razor cartridges is required, preferably with the flexibility to attach a wide variety of handles that have skin interconnect members to a comparatively smaller number of corresponding razor cartridges. Moreover, to avoid consumer confusion and lower manufacturing costs, it is preferable if a shaving razor system array can be designed such that any cartridge can be releasably attached to any handle while delivering both the benefit from the handle through the skin interconnect member and providing good shaving performance in terms comfort, closeness, and efficiency.

In FIG. 10A-H, schematics of the top surface views of the razor cartridge 15 and skin interconnect member 20 (i.e. similar to view 120A of FIG. 1B except including the skin interconnect member 20) Each view shows the cap 36, guard 34, corresponding cartridge shape 47 that mates to the skin interconnect member 20, and blades 17 include the first blade edge 82. In the views 125A-125D and 126A-126D shown in FIG. 10, the corresponding cartridge shape 47 in the razor cartridge 15 that mates or joins the shape of the skin interconnect member 20 of the razor handle 12 may be located at any position within the guard 34 of the razor cartridge. These positions even include the razor cartridge configuration shown in views 125D and 126D where a section of the front guard wall of the razor cartridge 15 does not fully enclose the perimeter of the skin interconnect member 20. In these cartridge configurations, a remnant front guard wall portion 48 of the guard 34 will remain in front of at least a part of the skin interconnect member 20, enabling the razor cartridge 15 to be mated or latched to the skin interconnect member 20.

A shaving razor system array that consists of a variety of different razor handles with skin interconnect and a variety of different razor cartridges where any cartridge fits any handle preferably has the corresponding cartridge shape 47 preferably positioned as close to the first blade 82 as possible. Such a location can enable good delivery of a variety of handle benefits through the skin interconnect member 20 and good shave performance using a variety of cartridges. The embodiments having locations of the cartridge shape 47 shown in views 125A-125D may be preferred to embodiments shown in views 126A-126D.

Figure 11A:
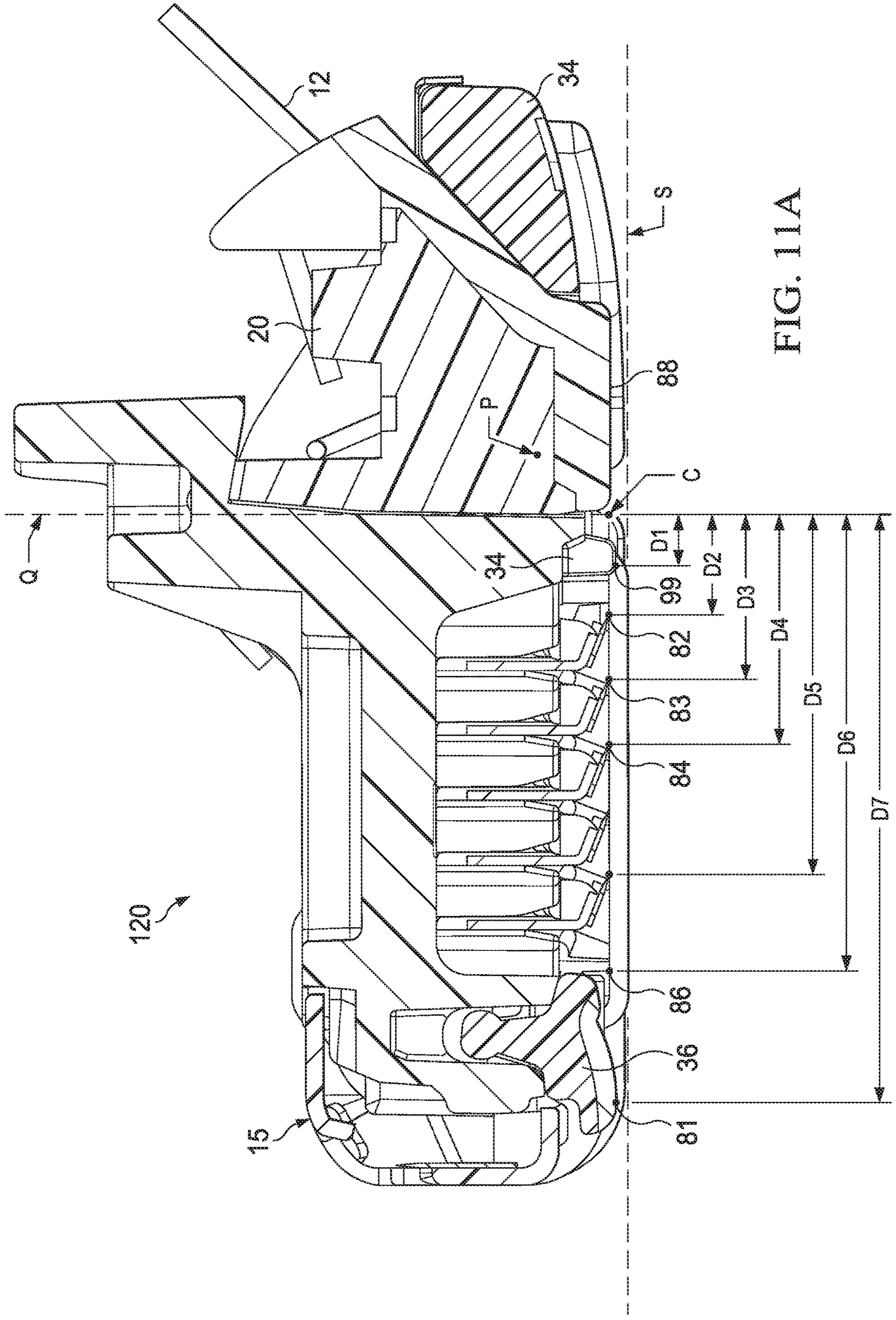
FIG. 11A is a cross-sectional view of the razor system showing a pivot point region in accordance with the present invention.
Figure 11B:
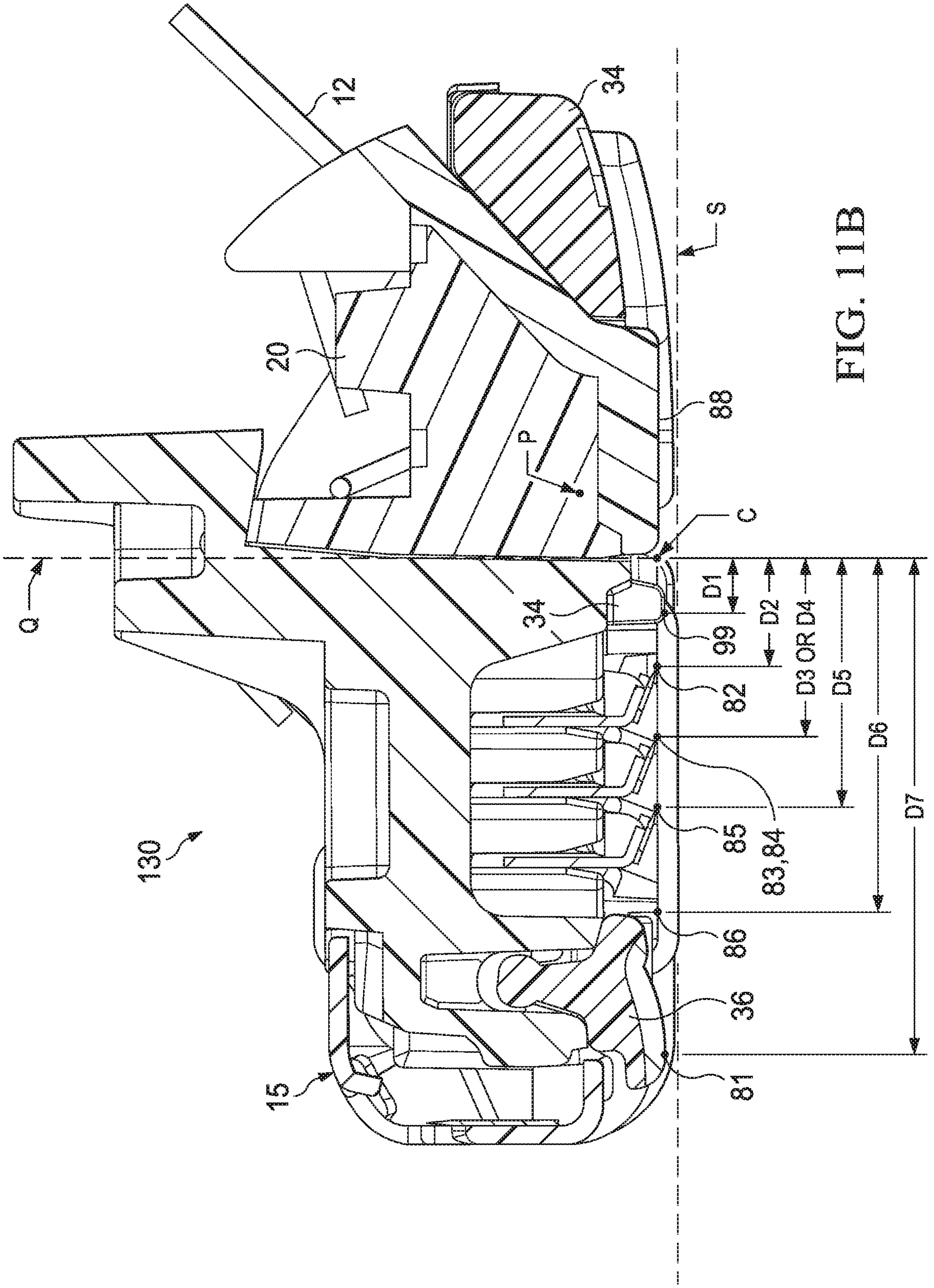
FIG. 11B is a cross-sectional view of the razor system showing a pivot point region in accordance with the present invention.

Moreover, because razor handles, and razor cartridges are designed to work optimally together, a shaving razor system array that consists of a variety of different razor handles having skin interconnect members and a variety of different razor cartridges where any cartridge fits any handle preferably has a fixed distance between point C shown in FIGS. 8 and 9 and key cartridge features contained within region R. Two non-limiting razor cartridge embodiments are shown in FIGS. 11A and 11B that work in any cartridge fits any handle using a skin interconnect member. View 120 corresponds to a 5-bladed razor cartridge while view 130 shows a 3-bladed razor cartridge. In both views, distances parallel to the shave plane S between point C and key features of the razor cartridge are defined including D1, D2, D3, D4, D5, D6, and D7. D1 is the distance parallel to the shave plane S between point C and closest guard point 99 on the guard 34 to the first blade edge 82. D2 is the distance parallel to the shave plane S between point P and the first blade edge 82. D3 is the distance parallel to the shave plane S between point C and the second blade edge 83. D4 is the averaged distance parallel to the shave plane S between point C and all the blades edges of the cartridge. The location of the averaged distance is given by point 84. In view 130 of FIG. 11B, D4 equals D3 and point 84 lies on the second blade edge 83 because the razor cartridge 15 contains only 3 blades. D5 is the distance parallel to the shave plane S between point C and the last blade edge 85. D6 is the distance parallel to the shave plane S between point C and the close cap point 86 on the cap 36 to the last blade edge 85. D7 is the distance parallel to the shave plane S between point C and the tallest cap point 81 on the cap 36. Depending on the design of the shaving razor system array in which any cartridge fit any handle, D1, D2, D3, D4, D5, D6, D7 or any combination thereof may be held about constant for all combinations of cartridges and handles. Preferred distances for D1 are about 0.5 mm to about 2 mm, for D2 are about 0.9 mm to about 2.4 mm, and for D3 are about 1.3 mm to about 3.0 mm.

The at least on skin interconnect member 20 may be in pivotal relation to either the proximal end portion 16, the distal end portions 18, or both the proximal end and distal end portions of the handle 12. The at least one skin interconnect member 20 may be in pivotal relation to the handle 12 via, for example, a spring, a joint, a hinge, a bearing, or any other suitable connection that enables the at least one skin interconnect member to be in pivotal relation to the handle. The at least one skin interconnect member may be in pivotal relation to the handle 12 via mechanisms that contain one or more springs and one or more sliding contact bearings, such as a pin pivot, a shell bearing, a linkage, a revolute joint, a revolute hinge, a prismatic slider, a prismatic joint, a cylindrical joint, a spherical joint, a ball-and-socket joint, a planar joint, a slot joint, a reduced slot joint, or any other suitable joint, or one or more springs and one or more rolling element bearings, such as a ball bearing, a cylindrical pin bearing, or rolling element thrust bearing. Sliding contact bearings can typically have friction levels of 0.1 to 0.3. Rolling element bearings can typically have friction of 0.001 to 0.01. Lower friction bearings are preferred the further a pivot mechanism is offset from its axis of rotation to assure smooth motion and prevent the bearing from sticking.

Typically, pivot mechanisms about axis A1 allow rotational motions ranging from about 0 degrees from the cartridge rest position to about 50 degrees. A rotational stiffness for a pivot mechanism about axis A1 may be measured by deflecting the pivot 25 degrees and measuring the required torque to maintain this position. Additionally, the torque levels at 50 degrees of rotation are generally less than 20 N-mm. The rotational stiffness (torque measured about the axis of rotation divided by degrees of angular rotation) associated with the A1 pivot axis is generally less than 0.3 N-mm per degree of rotation and preferably between 0.05 N-mm per degree of rotation and 0.18 N-m per degree of rotation.

Typically, pivot mechanisms about axis A2 or A3 (shown in FIG. 6C) allow rotational motions ranging from −40 degrees to +40 degrees. Pivot mechanisms about axis A4 (shown in 1A, 2A, and 6C) or axis A5 (shown in FIG. 12B) typically allow rotational motions ranging from −20 degrees to +20 degrees. A rotational stiffness for a pivot mechanism about axis A2, axis A3, axis A4, or axis A5 may be measured by deflecting the pivot −5 degrees and +5 degrees and measuring the required torques to maintain this position. The rotational stiffness may be calculated by dividing the absolute value of the difference in these measured torques by the 10 degrees of angular motion. The rotational stiffness associated with pivot mechanisms about A2, A3, A4, or A5 may generally range from about 0.8 to about 2.5 N-mm per degree of rotation.

In FIG. 5A, components of the skin interconnect member 20 and the pivoting mechanism 30 that enable rotation about axis A1 for the embodiment were shown in detail. The proximal end portion 16 of the handle 12 was connected to the skin interconnect member 20 by a pair of bracket arms 59, a spring return element 55, and the benefit delivery connection 71. In the embodiments shown in FIG. 5B, the spring return element is made of a metal. A pivoting mechanism that comprises a spring return element made of a stress-relaxation resistant material such as metal, polyetheretherketone, or silicone rubber is preferable because it can help prevent the razor 10 or razor handle 12 from taking a "set"—permanently deforming at deflected angle when the razor 10 or razor handle 12 is stored improperly due to the stress relaxation of the components that connect the skin interconnect member to the proximal end of the handle.

Moreover, since the benefit delivery connection 71, such as the flexible circuit element shown in FIG. 2B and fluid delivery element in FIGS. 3B and 5A of a pivot mechanism, is typically comprised of materials that stress relax, it is preferable if the rotational stiffness of the spring return element made from the stress-relaxation-resist material is greater than 50% the rotational stiffness of the pivot mechanism. The rotational stiffness of the spring return element alone can be measured by cutting out the benefit delivery connection 71 at its points of contact with the skin interconnect member 20 and the proximal end 16 of the handle 12. An alternate way of stating this preferable configuration is rotational stiffness of the pivot mechanism is greater than twice the rotational stiffness of said pivot mechanism with said benefit delivery connection disconnected at the proximal end of the handle and at the skin interconnect member, and preferably greater than five times the rotational stiffness of said pivot mechanism with said benefit delivery connection disconnected at the proximal end of the handle and at the skin interconnect member. This preferable configuration greatly reduces the probability and conditions under which the razor 10 or razor handle 12 can take a "set". The rotational stiffness of a pivot mechanism (with or without benefit delivery connection) about axis A1, axis A2, axis A3, axis A4, axis A5, or any combination thereof can be measured by the procedure outlined above.

Having a skin interconnect member in a razor does not inhibit the construction and order of connection of razor components. The present invention contemplates that the order of connection of the various components of the shaving razor may vary while also enabling motion about axes A1, A2, A3, A4, and/or A5. The components of the shaving razor generally include the razor cartridge 15, the handle 12, the skin interconnect member 20, and the mechanisms or structures that provide the motion about axes A1, A2, A3, A4, and/or A5. The mechanisms and components thereof, that provide these motions are preferably found in the handle.

Figure 12A:
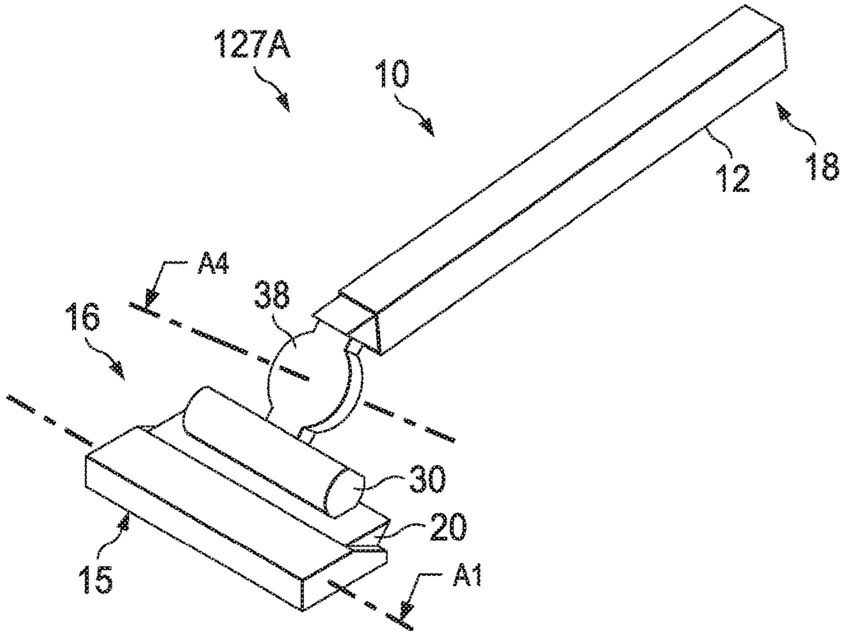
FIGS. 12A-12G are perspective views of embodiments having various physical orders of connection of razor components in accordance with the present invention.
Figure 12B:
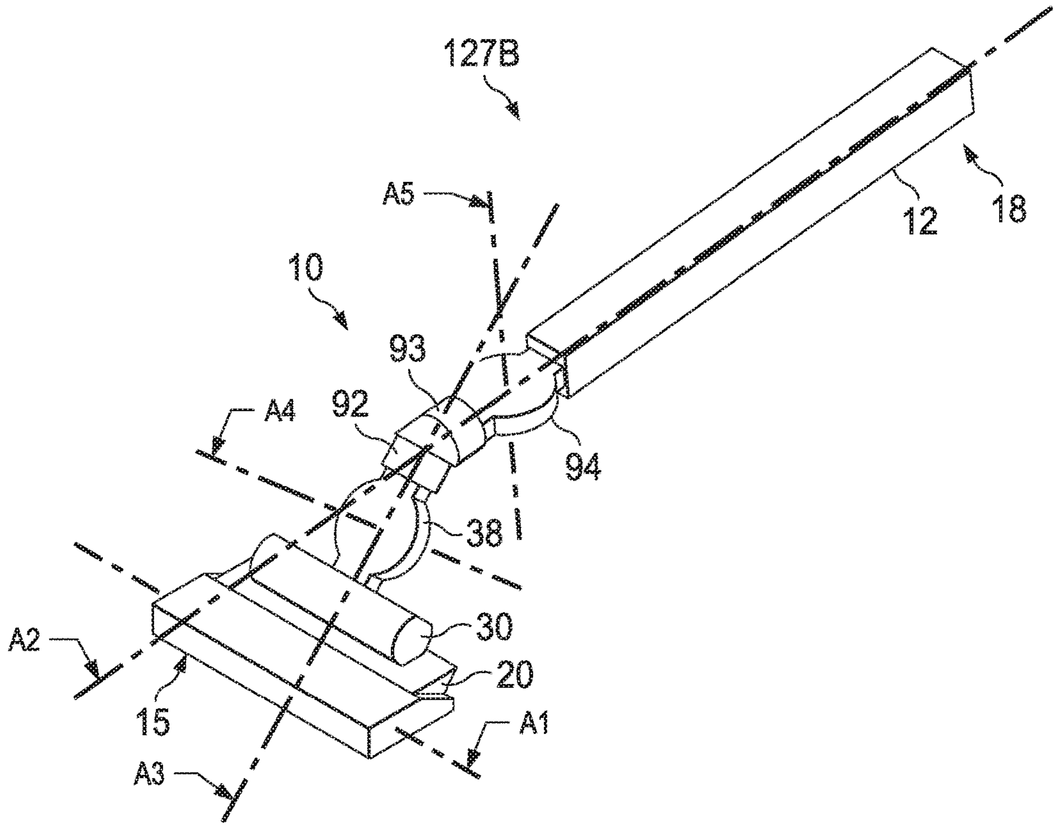
Figure 12C:
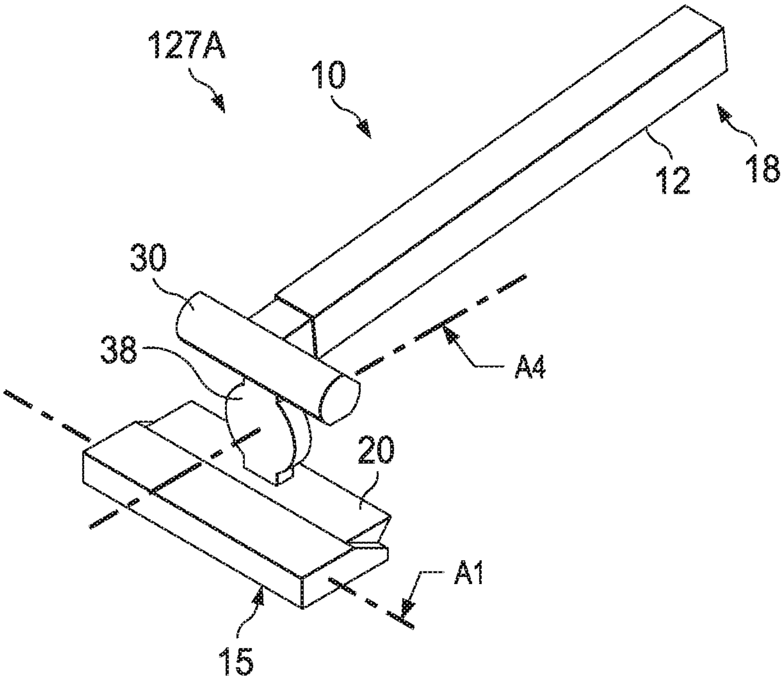
Figure 12D:
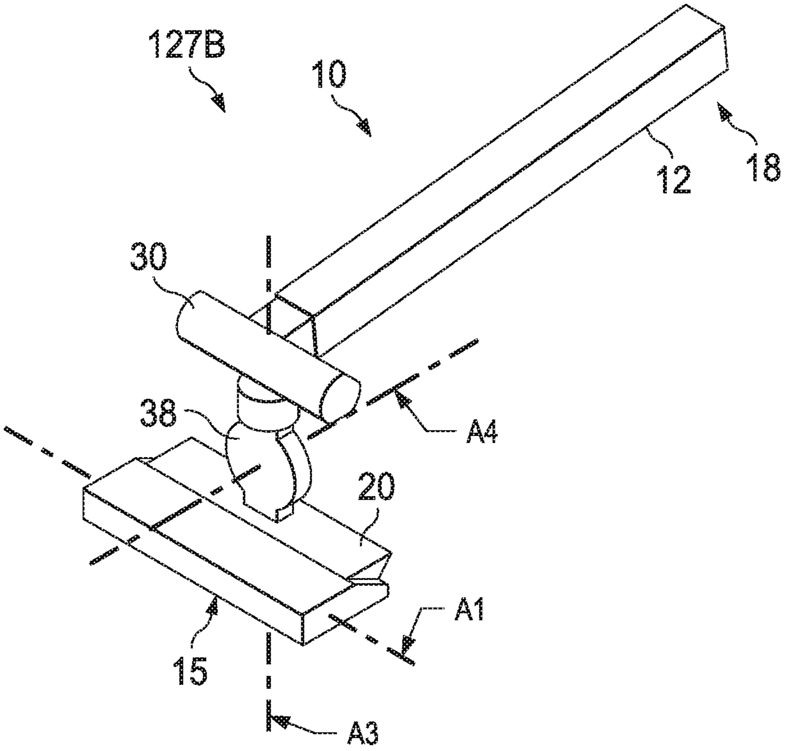
Figure 12E:
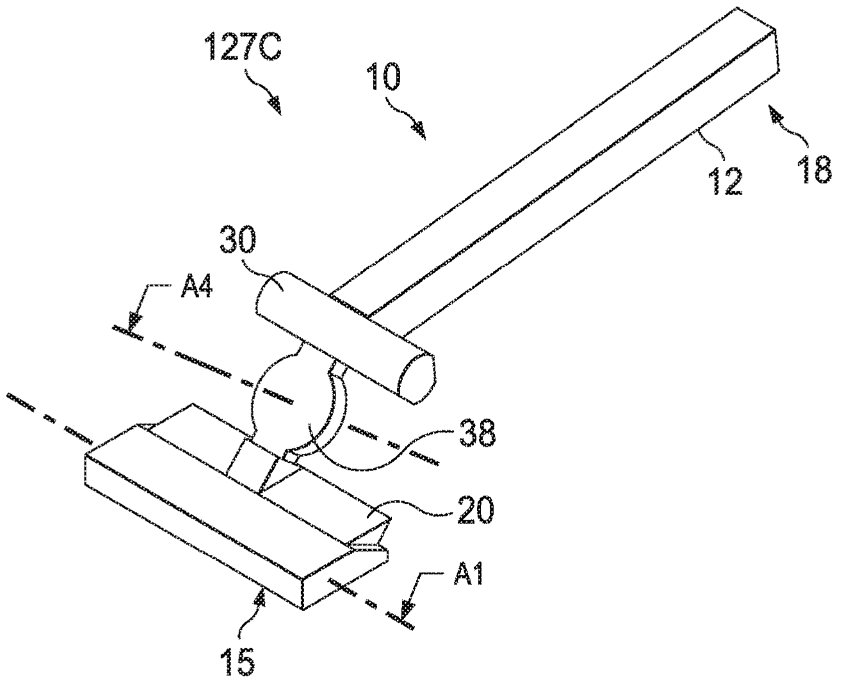
Figure 12F:
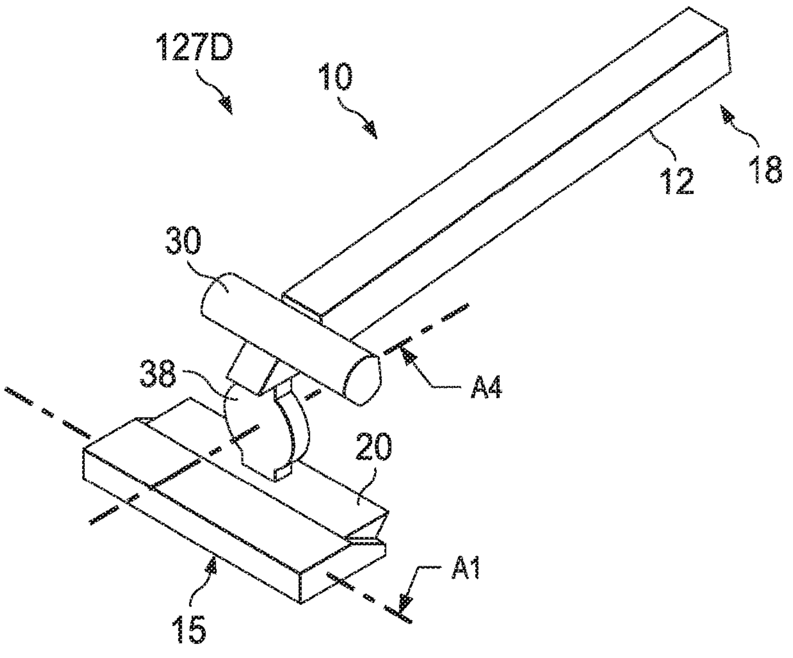
Figure 12G:
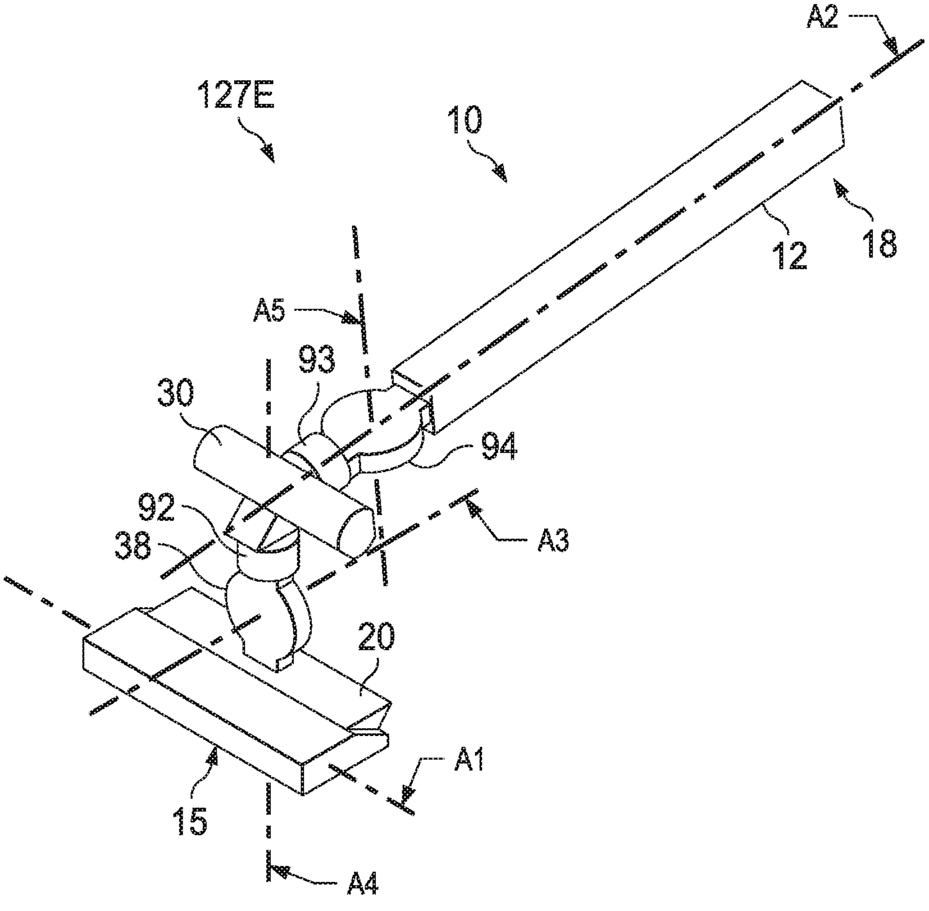

In one embodiment, shown in view 127A of FIG. 12A the order of physical connection of these shaving razor components, starting furthest away from the distal end portion 18 of the handle 12, is (1) the razor cartridge 15, (2) the skin interconnect member 20, (3) the mechanism 30 to enable rotation about axis A1 (e.g., the components such as spring and bracket arms shown in the embodiment described in FIG. 5B) (4) mechanism 38 to enable rotation about axis A4 (e.g. such as the components of the GILLETTE® Flexball™ razor and the components disclosed in co-owned, co-pending US application which is hereby incorporated herein by reference), and (5) the handle 12. That is the razor cartridge 15 is connected to the skin interconnect member 20, the skin interconnect member 20 is connected to the axis A1 mechanism 30, the axis A4 mechanism 38 is connected to the axis A1 mechanism 30, which is then connected to the handle 12. An embodiment that enables motion about the axis A5 can beneficially enable the razor cartridge to more closely follow the contours of the skin during a shave stroke. View 127B of FIG. 12B shows another embodiment of the present invention with additional mechanisms to enable rotation about specific axes of rotation—specifically mechanism 92 to enable rotation about axis A3, mechanism 93 to enable rotation about axis A2, and mechanism 94 to enable rotation about axis A5. Mechanisms 38, 92, and 93 are each located in the handle neck area 23 and mechanism 93 and 94 are located in the handle main body area 21. The addition of mechanisms 92, 93, and 94 or the replacement of other mechanisms with 92, 93, and 94 can provide flexibility in design, compound angles of motion to enable the razor cartridge 15 to better follow the skin during a shaving stroke, and smaller, simpler mechanisms.

Referring to FIG. 12B and the embodiment shown in view 127A, the order of physical connection of these razor components, starting furthest away from the distal end portion 18 of the handle 12 is (1) the razor cartridge 15, (2) the skin interconnect member 20, (3) the mechanism 38 to enable rotation about axis A4 which may include the bottom pod 19 and a spring return element, (4) the mechanism to enable rotation about axis A1, and (5) the handle 12. That is the razor cartridge is connected to the skin interconnect member, the skin interconnect member is connected to the axis A4 mechanism 38, the axis A4 mechanism 38 is connected to the axis A1 mechanism 30, which is then connected to the handle 12. The axis A1 mechanism 30 can have a similar design to that described in FIG. 5 including the bearings, spring return element and bracket arms.

In views 127B-127E of FIG. 12B, other embodiments are shown with the order of physical connection, starting furthest away from the distal end portion 18 of the handle 12, of the first three of the razors components is (1) the razor cartridge 15, (2) the skin interconnect member 20, and (3) a mechanism that does not enable rotation solely about axis A1. The axis A1 mechanisms 30 of the non-limiting embodiments in FIG. 12B can be in the handle neck area 21 (views 127A and 127B), the handle main body 23 (views 127D and 127E), or the junction between the handle neck area 21 and the handle main body 23 (view 127C). Because of the separation between the skin interconnect member 20 and axis A1 mechanism 30, these embodiments can make it feasible to have a rotational movement (e.g., a yaw motion or a roll motion) closer to the cartridge. This order of physical connection can enable simpler pivot mechanisms, more modular razor designs and notably, skin interconnect members with larger volumes.

Alternatively, or additionally, the axis A1, axis A2, axis A3, and/or axis A4 mechanisms may be combined in any order of connection or combined into one unit. The combinations of different order of connection of mechanisms about different axes of motion can provide flexibility in the razor system design to deliver good shave performance and benefits from the handle via the skin interconnect element. The combination into one unit may be referred to as providing a universal type pivoting motion.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving razor system comprising:

a razor cartridge, said razor cartridge comprising a housing having a front side, a back side opposing said front side, and a front blade mounted to said housing, said front blade is closer to said front side than said back side of said housing; and a handle, said handle comprising a proximal end portion, a distal end portion, at least one interconnect member, a first A1 pivot mechanism that enables rotation of said at least one interconnect member about a first axis A1 relative to said handle, and at least one second pivot mechanism that enables rotation of said at least one interconnect member relative to said handle about axis A2, A3, A4, or A5;

wherein said axis A2, A3, A4, or A5 are not parallel to said axis A1;

wherein an order of physical connection of components comprises:

said razor cartridge removably connected to said at least one interconnect member, said at least one interconnect member connected to said at least one second pivot mechanism to enable rotation about said axis A5, A4, A3, or A2, said at least one second pivot mechanism to enable rotation about said axis A5, A4, A3, or A2 connected to said first A1 pivot mechanism to enable rotation about said axis A1, and said first A1 pivot mechanism connected to said handle;

wherein said axis A1 is (i) transverse to a longitudinal axis of said handle and (ii) parallel to a longitudinal axis of said front blade;

wherein said at least one interconnect member projects through an opening in said housing of said razor cartridge such that a skin interfacing surface of said at least one interconnect member interfaces with a user's skin during a shaving process; and wherein said opening extends through said housing from a top surface to a bottom surface of said housing, and wherein a perimeter of said opening at said bottom surface is larger than a perimeter of said opening at said top surface.

2. The shaving razor system of claim 1 wherein said at least one interconnect member in said opening of said housing provides a pivot point P for pivoting said razor cartridge about the first axis A1 relative to said handle.

3. The shaving razor system of claim 1 wherein said at least one interconnect member is connected to said proximal end portion of said handle by said first A1 pivot mechanism, and wherein said first A1 pivot mechanism comprises one or more bearings.

4. The shaving razor system of claim 1 wherein said skin interfacing surface comprises a fluid element, a thermal element, a skin scrubbing element, a hair trimmer, an epilator, or any combination thereof.

5. The shaving razor system of claim 1 wherein said at least one interconnect member comprises a trapezoidal prism shape.

6. The shaving razor system of claim 1 wherein said skin interfacing surface is not disposed on a shave plane formed by a guard and a cap of said razor cartridge.

7. The shaving razor system of claim 1 wherein said handle comprises a mass of about 57 grams to about 150 grams.

8. The shaving razor system of claim 1 wherein said opening of said housing of said razor cartridge is releasably engaged with said at least one interconnect member to replaceably secure said razor cartridge to said proximal end portion of said handle.

9. The shaving razor system of claim 1 wherein said at least one interconnect member has a length from about 20 mm to about 40 mm, a width from about 1.5 mm to about 5 mm, a volume greater than about 300 $mm^3$, and a skin interfacing surface area of about 40 $mm^2$ to about 120 $mm^2$.

10. The shaving razor cartridge of claim 1 wherein one or more ports are disposed on said skin interfacing surface.

11. The shaving razor system of claim 1 wherein said at least one interconnect member is connected to said proximal end portion of said handle by said first A1 pivot mechanism, wherein said first A1 pivot mechanism comprises one or more sliding contact bearings, rolling element bearings, or combination thereof.

12. The shaving razor system of claim 1 wherein said handle comprises a handle neck area at said proximal end portion of said handle and a handle main body at an elongated gripping portion of said handle, and wherein a PL1-to-PL2 included angle between a shave plane S formed by a cap and a guard of said razor cartridge and a midplane PL2 formed by said handle main body is about −60 degrees to +90 degrees.

13. The shaving razor system of claim 1 wherein said handle comprises a handle neck area at said proximal end portion of said handle and a handle main body at an elongated gripping portion of said handle, and wherein a PL2-to-PL3 included angle between a midplane PL2 formed by said handle main body and a midplane PL3 formed by said handle neck area is about −100 degrees to +100 degrees.

14. The shaving razor system of claim 1 wherein said at least one interconnect member is not pivotal relative to said housing.

* * * * *